US010612943B2

(12) United States Patent
Cook

(10) Patent No.: US 10,612,943 B2
(45) Date of Patent: Apr. 7, 2020

(54) WINDING AND SCALE CONFIGURATION FOR INDUCTIVE POSITION ENCODER

(71) Applicant: Mitutoyo Corporation, Kanagawa-ken (JP)

(72) Inventor: Ted Staton Cook, Kirkland, WA (US)

(73) Assignee: Mitutoyo Corporation, Kanagawa-ken (JP)

(*) Notice: Subject to any disclaimer, the term of this patent is extended or adjusted under 35 U.S.C. 154(b) by 142 days.

(21) Appl. No.: 15/850,457

(22) Filed: Dec. 21, 2017

(65) Prior Publication Data
US 2018/0113004 A1 Apr. 26, 2018

Related U.S. Application Data

(63) Continuation-in-part of application No. 15/245,560, filed on Aug. 24, 2016, now Pat. No. 10,520,335.

(51) Int. Cl.
*G01D 5/20* (2006.01)
*G01D 5/22* (2006.01)

(52) U.S. Cl.
CPC ........... *G01D 5/202* (2013.01); *G01D 5/2216* (2013.01)

(58) Field of Classification Search
CPC ...... G01D 5/44; G01D 5/2492; G01D 5/2497; G01D 5/25; G01D 5/2451; G01D 5/34746;
(Continued)

(56) References Cited

U.S. PATENT DOCUMENTS 5,841,274 A * 11/1998 Masreliez ............ G01D 5/2053
324/207.17

5,886,519 A * 3/1999 Masreliez .............. G01B 3/205
324/207.17
(Continued)

FOREIGN PATENT DOCUMENTS

CN 1272620 A 11/2000
CN 1441226 A 9/2003
(Continued)

OTHER PUBLICATIONS

Chinese Office Action, dated Jul. 2, 2019, for Chinese Application No. 2017107342215, 22 pages. (with English Translation).
(Continued)

*Primary Examiner* — Patrick Assouad
*Assistant Examiner* — Sean Curtis
(74) *Attorney, Agent, or Firm* — Seed IP Law Group LLP

(57) ABSTRACT

An electronic position encoder includes a scale comprising first and second pattern tracks including respective signal modulating scale patterns, a detector and a signal processing configuration. The detector includes first-track and second-track field generating coil portions that surround first and second interior areas aligned with the first pattern track and second pattern track, respectively. The first-track and second-track field generating coil portions each include first and second elongated portions extending along the measuring axis direction, connected to end portions extending along a y-axis direction transverse to the measuring axis. The detector includes sensing elements that span across the first and second interior areas along the y-axis direction. A nominal y-axis trace width dimension of the elongated portions is at least 0.1 times a y-axis width of the first and/or second interior areas. In various implementations, a shielded end section may be used to connect the elongated portions.

21 Claims, 8 Drawing Sheets

(58) Field of Classification Search
CPC ... G01D 5/347; G01D 5/34776; G01J 1/0266; G01J 3/0289; G01J 5/089
USPC .............. 324/207.15–207.17, 207.23–207.26
See application file for complete search history.

(56) References Cited

U.S. PATENT DOCUMENTS

| | | | |
|---|---|---|---|
| 5,894,678 A | 4/1999 | Masreliez et al. | |
| 5,901,458 A * | 5/1999 | Andermo | G01D 5/2086 324/207.24 |
| 5,936,399 A * | 8/1999 | Andermo | G01D 5/202 324/207.17 |
| 5,973,494 A * | 10/1999 | Masreliez | G01D 5/2046 324/207.17 |
| 5,998,990 A * | 12/1999 | Andermo | G01D 5/2086 324/207.12 |
| 6,002,250 A * | 12/1999 | Masreliez | G01D 5/2053 324/207.16 |
| 6,011,389 A * | 1/2000 | Masreliez | G01D 5/2046 324/207.17 |
| 6,049,204 A * | 4/2000 | Andermo | G01B 7/02 324/207.12 |
| 6,124,708 A | 9/2000 | Dames | |
| 6,329,813 B1 * | 12/2001 | Andermo | G01B 3/205 324/207.12 |
| 6,335,618 B1 * | 1/2002 | Nahum | G01B 3/205 324/207.17 |
| 6,400,138 B1 * | 6/2002 | Andermo | G01B 3/205 324/207.12 |
| 6,522,129 B2 | 2/2003 | Miyata | G01D 5/2053 324/207.16 |
| 6,531,866 B2 * | 3/2003 | Miyata | G01D 5/2086 324/207.12 |
| 6,545,461 B1 * | 4/2003 | Miyata | G01D 5/2053 324/207.17 |
| 6,573,707 B2 * | 6/2003 | Kiriyama | G01D 5/2086 324/207.17 |
| 6,628,115 B2 * | 9/2003 | Sasaki | G01B 7/003 324/207.17 |
| 6,646,433 B2 * | 11/2003 | Milvich | G01D 5/2053 324/207.12 |
| 6,646,434 B2 * | 11/2003 | Miyata | G01D 5/208 324/207.17 |
| 6,714,004 B2 * | 3/2004 | Jagiella | F15B 15/2846 324/207.16 |
| 6,720,760 B2 * | 4/2004 | Milvich | G01D 5/2086 324/207.17 |
| 7,015,687 B2 * | 3/2006 | Meyer | G01D 5/2053 324/207.17 |
| 7,239,130 B1 * | 7/2007 | Milvich | G01D 5/2086 324/207.12 |
| 7,530,177 B1 * | 5/2009 | Meichle | G01B 3/205 33/708 |
| 7,652,469 B2 * | 1/2010 | Meyer | G01D 5/202 324/207.15 |
| 7,906,958 B2 * | 3/2011 | Nakayama | G01D 5/2073 324/207.15 |
| 8,309,906 B2 * | 11/2012 | Kapner | G01D 5/24476 250/231.16 |
| 8,847,583 B2 * | 9/2014 | Sasaki | G01D 5/2086 324/207.17 |
| 8,928,311 B2 * | 1/2015 | Sasaki | G01D 5/2073 324/207.17 |
| 9,267,819 B2 * | 2/2016 | Cook | G01D 5/20 |
| 9,325,060 B2 * | 4/2016 | Kalistaja | H05K 3/125 |
| 9,435,663 B2 * | 9/2016 | Cook | G01D 5/2066 |
| 9,612,136 B1 * | 4/2017 | Cook | G01D 5/2455 |
| 9,678,701 B2 * | 6/2017 | Cook | G01B 3/205 |
| 9,683,869 B1 * | 6/2017 | Kapner | G01D 5/20 |
| 9,772,202 B1 * | 9/2017 | Cook | G01D 5/20 |
| 9,833,802 B2 * | 12/2017 | Kalistaja | H05K 3/1241 |
| 9,835,473 B2 * | 12/2017 | Nahum | G01D 5/2086 |
| 9,958,294 B2 * | 5/2018 | Cook | G01D 5/20 |
| 2001/0003422 A1 * | 6/2001 | Andermo | G01D 5/2495 324/207.17 |
| 2002/0024335 A1 * | 2/2002 | Kiriyama | G01D 5/2086 324/207.17 |
| 2002/0030484 A1 * | 3/2002 | Kiriyama | G01D 3/08 324/207.17 |
| 2002/0030485 A1 * | 3/2002 | Gleixner | G01D 5/2073 324/207.17 |
| 2003/0090264 A1 * | 5/2003 | Milvich | G01D 5/2086 324/207.16 |
| 2003/0128028 A1 * | 7/2003 | Jordil | G01B 3/205 324/207.21 |
| 2003/0160608 A1 * | 8/2003 | Milvich | G01D 5/2053 324/207.17 |
| 2006/0103376 A1 * | 5/2006 | Ma | G01B 3/205 324/207.24 |
| 2010/0001718 A1 * | 1/2010 | Howard | G01B 7/003 324/207.15 |
| 2011/0254541 A1 * | 10/2011 | Sasaki | G01D 5/2086 324/207.15 |
| 2012/0007591 A1 * | 1/2012 | Howard | G01B 7/003 324/207.15 |
| 2014/0184202 A1 * | 7/2014 | Horiguchi | G01D 5/24438 324/207.11 |
| 2015/0375246 A1 * | 12/2015 | Kalistaja | H05K 3/1241 174/250 |
| 2016/0054154 A1 * | 2/2016 | Cook | G01D 5/2066 324/207.17 |
| 2016/0146636 A1 * | 5/2016 | Nahum | G01D 5/2053 324/207.17 |
| 2017/0089738 A1 * | 3/2017 | Cook | G01D 5/2455 |
| 2017/0167893 A1 * | 6/2017 | Kapner | G01D 5/20 |
| 2017/0268906 A1 * | 9/2017 | Nahum | G01D 5/2086 |
| 2018/0058883 A1 * | 3/2018 | Cook | G01B 3/205 |
| 2018/0113004 A1 * | 4/2018 | Cook | G01D 5/202 |
| 2018/0180452 A1 * | 6/2018 | Cook | G01D 5/34792 |
| 2018/0195880 A1 * | 7/2018 | Cook | G01B 3/205 |
| 2019/0120660 A1 * | 4/2019 | Hitchman | G01D 5/2053 |

FOREIGN PATENT DOCUMENTS

| | | | | |
|---|---|---|---|---|
| CN | 105415882 A | | 3/2016 | |
| EP | 1 014 041 B1 | | 5/2005 | |
| JP | 2017067769 A | * | 4/2017 | ......... G01D 5/34776 |
| JP | 2018004628 A | * | 1/2018 | ........... G01D 5/2497 |
| JP | 2018004630 A | * | 1/2018 | |
| JP | 2018031777 A | * | 3/2018 | ............. G01D 5/202 |
| JP | 2018105854 A | * | 7/2018 | ......... G01D 5/34792 |

OTHER PUBLICATIONS

Cook, "Absolute Position Encoder Including Scale With Varying Spatial Characteristic and Utilizing Fourier Transform or Other Signal Processing," U.S. Appl. No. 15/199,723, filed Jun. 30, 2016, 35 pages.

* cited by examiner

WINDING AND SCALE CONFIGURATION FOR INDUCTIVE POSITION ENCODER

CROSS-REFERENCE TO RELATED APPLICATION(S)

This application is a continuation-in-part of U.S. patent application Ser. No. 15/245,560, entitled "WINDING CONFIGURATION FOR INDUCTIVE POSITION ENCODER," filed Aug. 24, 2016, the disclosure of which is hereby incorporated herein by reference in its entirety.

BACKGROUND

Technical Field

This disclosure relates to measurement instruments, and more particularly to inductive position encoders that may be utilized in precision measurement instruments.

Description of the Related Art

Various encoder configurations may include various types of optical, capacitive, magnetic, inductive, movement and/or position transducers. These transducers use various geometric configurations of a transmitter and a receiver in a read head to measure movement between the read head and a scale. Magnetic and inductive transducers are relatively robust to contamination, but not perfectly so.

U.S. Pat. No. 6,011,389 (the '389 patent) describes an induced current position transducer usable in high accuracy applications, U.S. Pat. No. 5,973,494 (the '494 patent) and U.S. Pat. No. 6,002,250 (the '250 patent) describe incremental position inductive calipers and linear scales, including signal generating and processing circuits, and U.S. Pat. No. 5,886,519 (the '519 patent), U.S. Pat. No. 5,841,274 (the '274 patent), and U.S. Pat. No. 5,894,678 (the '678 patent) describe absolute position inductive calipers and electronic tape measures using an induced current transducer. U.S. Pat. No. 7,906,958 (the '958 patent) describes an induced current position transducer usable in high accuracy applications, wherein a scale having two parallel halves and a plurality of sets of transmitting coils and receiving coils mitigates certain signal offset components that may otherwise produce errors in an induced current position transducer. All of the foregoing are hereby incorporated herein by reference in their entireties. As described in these patents, an induced current transducer may be manufactured using printed circuit board technology and is largely immune to contamination.

However, such systems may be limited in their ability to provide certain combinations of features desired by users, such as combinations of compact size, signal strength, high resolution, cost, robustness to misalignment and contamination, etc. Configurations of encoders that provide improved combinations would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An electronic position encoder is provided that is usable to measure a relative position between two elements along a measuring axis direction that coincides with an x-axis direction. In various implementations, the electronic position encoder includes a scale, a detector portion and a signal processing configuration. The scale extends along the measuring axis direction and includes a signal modulating scale pattern comprising first and second pattern tracks arranged parallel to one another. Each pattern track has a track width dimension along a y-axis direction that is perpendicular to the x-axis direction between its interior boundary that is closest to the other pattern track and its exterior boundary that is farthest from the other pattern track. Each pattern track comprises signal modulating elements that are arranged to provide a spatially varying characteristic which changes as a periodic function of position along the x-axis direction;

The detector portion is configured to be mounted proximate to the pattern tracks and to move along the measuring axis direction relative to the pattern tracks. In various implementations, the detector portion includes a field generating coil configuration and a plurality of sensing elements.

The field generating coil configuration is fixed on a substrate and comprises first-track and second-track field generating coil portions. The first-track field generating coil portion surrounds a first interior area aligned with the first pattern track and has a nominal first interior area length dimension along the x-axis direction and a nominal first interior area width dimension along the y-axis direction and generates a changing first magnetic flux in the first interior area in response to a coil drive signal. The second-track field generating coil portion surrounds a second interior area aligned with the second pattern track and has a nominal second interior area length dimension along the x-axis direction and a nominal second interior area width dimension along the y-axis direction and generates a changing magnetic flux in the second interior area in response to the coil drive signal.

The plurality of sensing elements are arranged along the x-axis direction and fixed on a substrate. Each of the sensing elements has a nominal sensing element width dimension along the y-axis direction that spans the first and second interior areas, and the plurality of sensing elements are configured to provide detector signals which respond to a local effect on the changing magnetic flux provided by adjacent signal modulating elements of the scale pattern.

A signal processing configuration may be operably connected to the detector portion to provide the coil drive signal, and determines the relative position between the detector portion and the scale pattern based on detector signals input from the detector portion.

In various implementations, the field generating coil configuration comprises an input portion, first-track inside and outside elongated portions, and second-track inside and outside elongated portions, and associated end portions. The input portion includes at least two connection portions that connect the coil drive signal from the signal processing configuration to the field generating coil configuration. The first-track inside and outside elongated portions each extend along the x-axis direction adjacent to the first interior area. The first-track inside elongated portion is located adjacent to the first-track interior boundary and the first-track outside elongated portion is located adjacent to the first-track exterior boundary. The first-track inside and outside elongated portions each have a nominal first-track generating trace width dimension (which may be the same, or different from each other) along the y-axis direction. The second-track inside and outside elongated portions each extend along the x-axis direction adjacent to the second interior area. The second-track inside elongated portion is located adjacent to the first-track interior boundary and the second-track outside elongated portion is located adjacent to the second-track exterior boundary. The second-track inside and outside elongated portions each have a nominal second-track generating trace width dimension (which may be the same, or different from each other) along the y-axis direction. In various implementations, at least a majority of the nominal sensing element width dimension is included between the first-track outside elongated portion and the second-track outside elongated portion, and the field generating coil configuration is configured such that each nominal first-track generating trace width dimension is at least 0.1 times the nominal first interior area width dimension, and each nominal second-track generating trace width dimension is at least 0.1 times the nominal second interior area width dimension.

In some implementations, each nominal first-track generating trace width dimension is at least 0.15 times, or at least 0.25 times, or at least 0.50 times the nominal first interior area width dimension, and each nominal second-track generating trace width dimension is at least 0.15 times, or at least 0.25 times, or at least 0.50 times the nominal second interior area width dimension. In some implementations, the field generating coil configuration may be configured such that each nominal first-track and second-track generating trace width dimension is at least 25 times a skin depth of the elongated portions at a nominal operating frequency defined corresponding to the detector signals that arise in response to the changing magnetic flux.

In various implementations, the first and second pattern tracks each comprise the same type of signal modulating elements that are arranged according to a same spatial period or wavelength W along the x-axis direction in the first and second pattern tracks. The signal modulating elements in the second pattern track are offset along the measuring axis direction by a nominal scale track offset of approximately W/2 relative to the signal modulating elements in the first pattern track. In some such implementations, the field generating coil configuration is configured to generate the first-track changing magnetic flux with a first polarity in the first interior area, and generate the second-track changing magnetic flux with a second polarity that is opposite to the first polarity in the second interior area, and the plurality of sensing elements comprise magnetic flux sensing loops formed by conductive traces fabricated on a printed circuit board, and at least a majority of the magnetic flux sensing loops each span the first and second interior areas along the y-axis direction and provide the same sensing loop polarity in the first and second interior areas. In other such implementations, the field generating coil configuration is configured to generate the first-track changing magnetic flux with a first polarity in the first interior area, and generate the second-track changing magnetic flux with a second polarity that is the same as the first polarity in the second interior area, and the plurality of sensing elements comprise magnetic flux sensing loops formed by conductive traces fabricated on a printed circuit board, and at least a majority of the magnetic flux sensing loops each span the first and second interior areas along the y-axis direction and include a cross over or twisting of their conductive traces to provide opposite sensing loop polarities in the first and second interior areas. In some such implementations, for at least a majority of the magnetic flux sensing loops, the cross over or twisting of their conductive traces is located in a region including the first-track inside elongated portion and the second-track inside elongated portion between the first interior area and the second interior area, to avoid undesirable signal disturbances.

DETAILED DESCRIPTION

Figure 1:
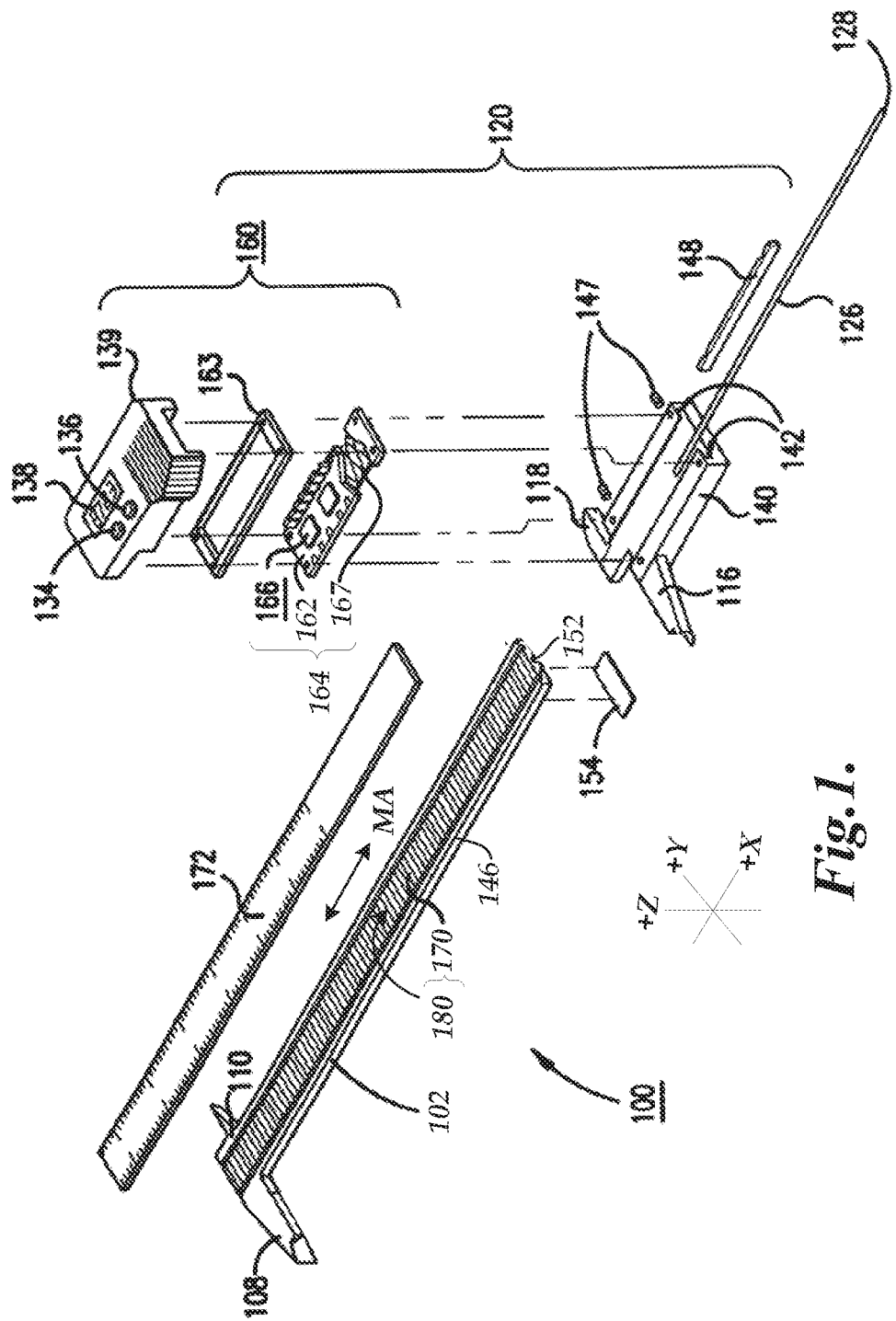
FIG. 1 is an exploded isometric view diagram of a hand tool type caliper utilizing an electronic position encoder including a detector portion and a scale.

FIG. 1 is an exploded isometric view diagram of a hand tool type caliper 100 including a scale member 102 having a spar of roughly rectangular cross-section including a scale 170, and slider assembly 120. In various implementations, the scale 170 may extend along the measuring axis direction MA (e.g., corresponding to an x-axis direction) and may include a signal modulating scale pattern 180. A known type of cover layer 172 (e.g., 100 µm thick) may cover the scale 170. Jaws 108 and 110 near a first end of the scale member 102 and movable jaws 116 and 118 on the slider assembly 120 are used to measure dimensions of objects in a known manner. The slider assembly 120 may optionally include a depth bar 126, restrained in a depth bar groove 152 under the scale member 102, by an end stop 154. The depth bar engagement end 128 may extend into a hole to measure its depth. A cover 139 of the slider assembly 120 may include an on/off switch 134, a zero-setting switch 136 and a measurement display 138. A base 140 of the slider assembly 120 includes a guiding edge 142 which contacts a side edge 146 of the scale member 102, and screws 147 bias a resilient pressure bar 148 against a mating edge of the scale member 102 to ensure proper alignment for measuring, and for moving a read head portion 164 relative to the scale 170.

A pickoff assembly 160 mounted on the base 140 holds the read head portion 164 which, in this implementation, includes substrate 162 (e.g., a printed circuit board) that carries a detector portion 167 including a field generating coil configuration and a group of sensing elements (e.g., collectively a field generating and sensing winding configuration) arranged along the measuring axis direction MA, and a signal processing configuration 166 (e.g., a control circuit). A resilient seal 163 may be compressed between the cover 139 and the substrate 162 to exclude contamination from the circuitry and connections. The detector portion 167 may be covered by an insulative coating.

In one specific illustrative example, the detector portion 167 may be arranged parallel with and facing the scale 170, and a front face of the detector portion 167 that faces the scale 170 may be separated from the scale 170 (and/or the scale pattern 180) by a gap on the order of 0.5 mm along the depth (Z) direction. Together, the read head portion 164 and the scale 170 may form a transducer as part of an electronic position encoder. In one implementation, the transducer may be an eddy current transducer which operates by generating changing magnetic fields, wherein the changing magnetic fields induce circulating currents, known as eddy currents, in some of the signal modulating elements of the scale pattern 180 that are placed within the changing magnetic field, as will be described in more detail below. It will be appreciated that the caliper 100 shown in FIG. 1 is one of various applications that typically implement an electronic position encoder that has evolved over a number of years to provide a relatively optimized combination of compact size, low power operation (e.g., for long battery life), high resolution and high accuracy measurement, low cost, and robustness to contamination, etc. Even small improvements in any of these factors are highly desirable, but difficult to achieve, especially in light of the design constraints imposed in order to achieve commercial success in the various applications. The principles disclosed in the following description provide improvements in a number of these factors in a particularly cost effective and compact manner.

Figure 2:
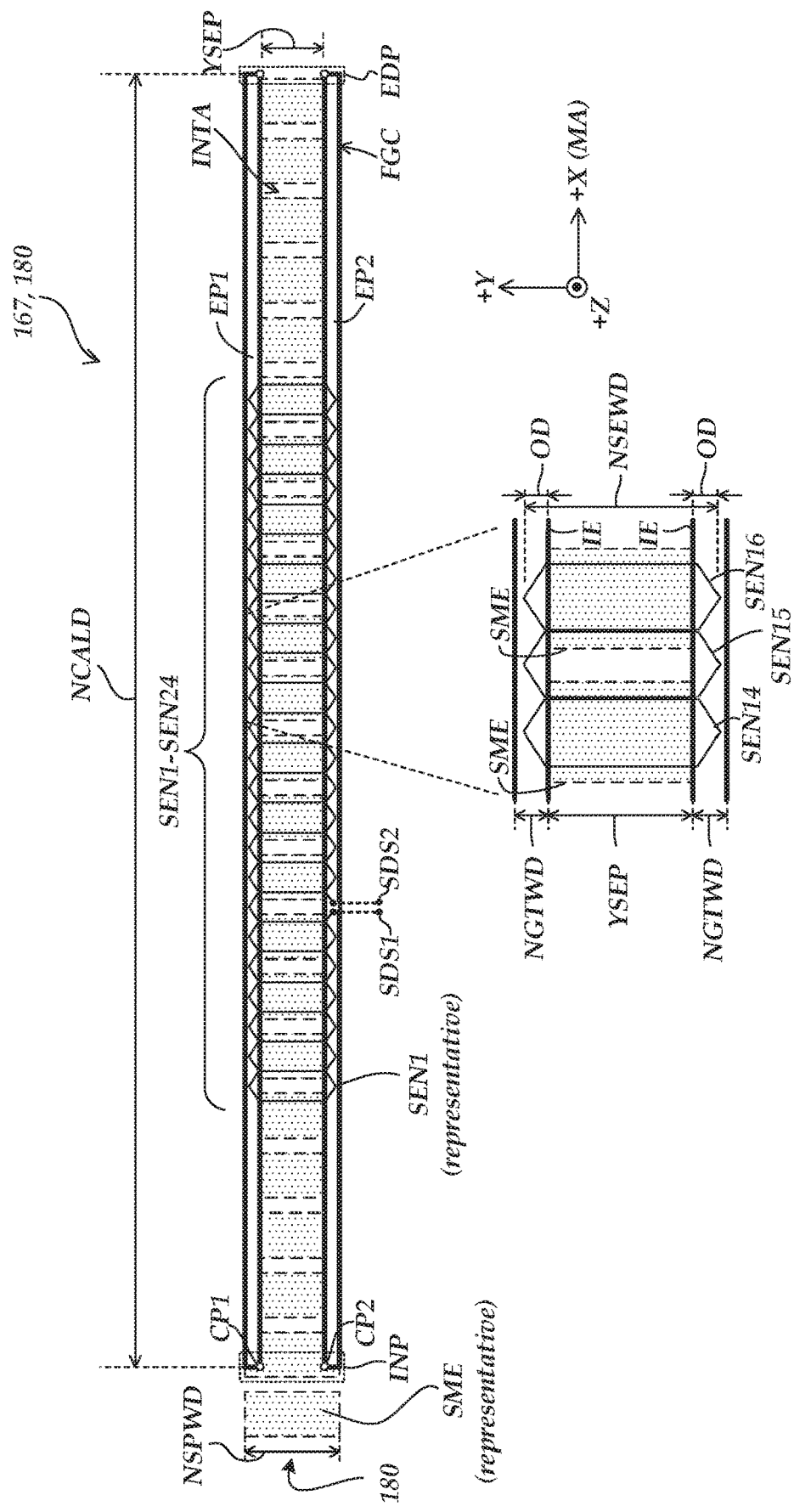
FIG. 2 is a plan view diagram illustrating a first exemplary implementation of a detector portion usable in an electronic position encoder.

FIG. 2 is a plan view diagram of a first exemplary implementation usable as the detector portion 167 and the signal modulating scale pattern 180 in the electronic position encoder shown in FIG. 1, or the like. FIG. 2 may be regarded as partly representational, partly schematic. An enlarged section of the detector portion 167 and scale pattern 180 is illustrated in the lower portion of FIG. 2. In FIG. 2, the various elements described below are represented by their shape or outline, and are shown superimposed on one another to emphasize certain geometric relationships. It should be understood that various elements may reside on different fabrication layers located at different planes along the z-axis direction, as needed to provide various operating gaps and/or insulating layers, as will be apparent to one of ordinary skill in the art based on the following description and/or as outlined in greater detail with reference to FIG. 4, below. Throughout the figures of this disclosure, it will be appreciated that the x-axis, y-axis and/or z-axis dimensions of one or more elements may be exaggerated for clarity.

The illustrated portion of the scale pattern 180 includes signal modulating elements SME shown in dashed outline, which are located on the scale 170 (shown in FIG. 1). The y-direction extremes of most of the signal modulating elements SME are hidden below the first and second elongated portions EP1 and EP2 in the embodiment illustrated in FIG. 2. It will be appreciated that the scale pattern 180 moves relative to the detector portion 167 during operation, as may be seen in FIG. 1.

In the example of FIG. 2, the scale pattern 180 has a nominal scale pattern width dimension NSPWD along a y-axis direction that is perpendicular to the x-axis, and comprises discrete signal modulating elements SME that are arranged periodically along the measuring axis direction MA (e.g., corresponding to an x-axis direction). However, more generally the scale pattern 180 may comprise various alternative spatially modulated patterns including discrete elements or one or more continuous pattern element(s), provided that the pattern has a spatial characteristic which changes as a function of position along the x-axis direction, so as to provide position dependent detector signals (also referred to as detector signal components, in some embodiments) arising in the sensing elements SEN (e.g., SEN14) of the detector portion 167, according to known methods.

Figure 4:
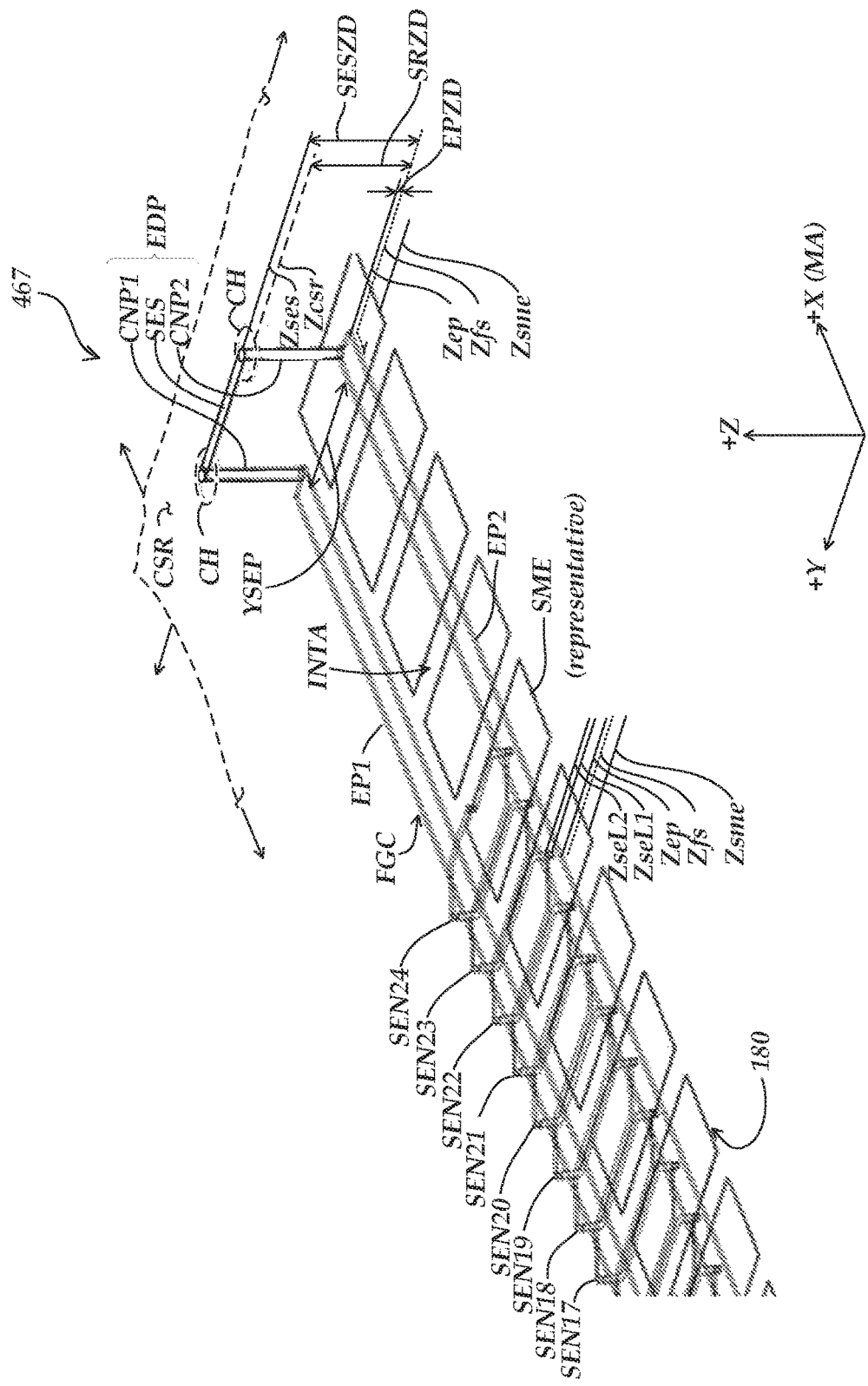
FIG. 4 is an isometric view diagram illustrating a first exemplary implementation of an end portion of a field generating coil configuration of a detector portion.

In various implementations, the detector portion 167 is configured to be mounted proximate to the scale pattern 180, and to move along the measuring axis direction MA relative to the scale pattern 180. The detector portion includes a field generating coil configuration FGC and a plurality of sensing elements, which may take a variety of alternative configurations to be used in combination with a variety of corresponding signal processing schemes in various embodiments, as will be understood by one skilled in the art. FIG. 2 shows a single representative set of sensing elements SEN1-SEN24, which in this particular embodiment comprise sensing loop elements (alternatively referred to as sensing coil elements or sensing winding elements) which are connected in series. In this embodiment, adjacent loop elements are connected by a configuration of conductors on various layers of PCB connected by feedthroughs according to known methods (e.g., as illustrated in FIG. 4) such that they have opposite winding polarities. That is, if a first loop responds to a changing magnetic field with a positive polarity detector signal contribution, then the adjacent loops respond with a negative polarity detector signal contribution. In this particular embodiment, the sensing elements are connected in series such that their detector signals or signal contributions are summed, and a "summed" detector signal is output at the detector signal output connections SDS1 and SDS2 to a signal processing configuration (not shown). Although FIG. 2 shows a single set of sensing elements to avoid visual confusion, it will be appreciated that in some embodiments it is advantageous to configure the detector to provide one or more additional sets of sensing elements at a different spatial phase position (e.g., to provide quadrature signals), as will be understood by one of ordinary skill in the art. However, it should be appreciated that the configurations of sensing elements described herein are exemplary only, and not limiting. As one example, individual sensing element loops may output individual signals to a corresponding signal processing configuration in some embodiments, for example as disclosed in commonly assigned copending U.S. patent application Ser. No. 15/199,723, filed Jun. 30, 2016, which is hereby incorporated by reference in its entirety. More generally, various known sensing element configurations may be used in combination with the principles disclosed and claimed herein, for use in combination with various known scale pattern and signal processing schemes, in various embodiments.

The various sensing elements and the field generating coil configuration FGC may be fixed on a substrate (e.g., substrate 162 of FIG. 1). The field generating coil configuration FGC may be described as surrounding an interior area INTA having a nominal coil area length dimension NCALD along the x-axis direction and a nominal coil area width dimension of approximately YSEP along the y-axis direction. In various implementations, the field generating coil configuration FGC may comprise a single turn surrounding the interior area INTA. In operation, the field generating coil configuration FGC generates a changing magnetic flux in the interior area INTA in response to a coil drive signal.

In various implementations, the field generating coil configuration FGC may include an input portion INP, first and second elongated portions EP1 and EP2, and an end portion EDP (e.g., implemented as disclosed with reference to FIGS. 4 and/or 5). The input portion INP includes first and second connection portions CP1 and CP2 that connect a coil drive signal from a signal processing configuration (e.g., the signal processing configuration 166 of FIG. 1, or the signal processing configuration 766 of FIG. 6, etc.) to the field generating coil configuration FGC. The first and second connection portions CP1 and CP2 may be connected to the signal processing configuration through printed circuit board feedthroughs or the like, and the connections may also be shielded utilizing principles analogous to those disclosed below with reference to the end portion EDP, in some embodiments. The first and second elongated portions EP1 and EP2 each extend along the x-axis direction adjacent to a side of the interior area INTA, and have a nominal generating trace width dimension NGTWD along the y-axis direction. In the illustrated embodiment, the nominal generating trace width dimensions NGTWD are the same for the first and second elongated portions EP1 and EP2, but this is not a requirement in all embodiments. The end portion EDP (e.g., implemented as disclosed with reference to FIGS. 4 and/or 5) spans the y-axis direction separation corresponding to the nominal coil width dimension YSEP between the first and second elongated portions EP1 and EP2 to provide a connection therebetween near an end of the interior area INTA. In various implementations according to principles disclosed herein, the field generating coil configuration FGC is advantageously configured using a design ratio wherein each nominal generating trace width dimension NGTWD is at least 0.1 times the nominal coil area width dimension YSEP. In some implementations, the field generating coil configuration FGC may be configured such that each nominal generating trace width dimension NGTWD is at least 0.15 times, or at least 0.25 times, or at least 0.50 times the nominal coil area width dimension YSEP. In some implementations, the field generating coil configuration FGC may be configured such that each nominal generating trace width dimension NGTWD is at least 25 times the skin depth of the elongated portions EP1 and EP2 at a nominal operating frequency defined corresponding to detector signals that arise in response to the changing magnetic flux.

The sensing elements SEN1-SEN24 are arranged along the x-axis direction (e.g., corresponding to the measuring axis direction MA) and are fixed on the substrate (e.g., substrate 162 of FIG. 1). In the example of FIG. 2, each of the sensing elements SEN has a nominal sensing element width dimension NSEWD along the y-axis direction, wherein at least a majority of the nominal sensing element width dimension NSEWD is included within the nominal coil area width dimension YSEP along the y-axis direction. The sensing elements SEN are configured to provide detector signals which respond to a local effect on the changing magnetic flux provided by an adjacent signal modulating portion of the scale pattern 180 (e.g., one or more signal modulating elements SME) of the scale 170. A signal processing configuration (e.g., the signal processing configuration 166 of FIG. 1, or the signal processing configuration 766 of FIG. 6, etc.) may be configured to determine a position of the plurality of sensing elements SEN1-SEN24 relative to the scale 170 based on the detector signals input from the detector portion 167. In general, the field generating coil configuration FGC and the sensing elements SEN1-SEN24, or the like, may operate according to known principles (e.g., for inductive encoders), such as those described in the incorporated references.

In various implementations, the field generating coil configuration FGC and the sensing elements SEN are insulated from one another (e.g., as located in different layers of a printed circuit board, etc.). In one such implementation, the nominal sensing element width dimension NSEWD of at least one sensing element SEN is advantageously greater than the nominal coil area width dimension YSEP and extends beyond an interior edge IE of at least one of the elongated portions EP1 or EP2 by an amount defined as an overlap dimension OD. In addition, the field generating coil configuration FGC may be advantageously configured such that each nominal generating trace width dimension NGTWD is larger than the corresponding overlap dimension OD, in various embodiments. In various implementations, the elongated portions EP1 and EP2 may be fabricated on a first layer of a printed circuit board, and the sensing elements SEN may comprise conductive loops fabricated in one or more layers of the printed circuit board that include a layer different than the first layer, at least in the vicinity of the overlap dimension OD.

In various implementations, the substrate may comprise a printed circuit board, and the field generating coil configuration FGC may comprise conductive traces (e.g., including the elongated portions EP1 and EP2) fabricated on the printed circuit board. In various implementations, the sensing elements SEN may comprise magnetic flux sensing loops formed by conductive traces fabricated on the printed circuit board. As described above with respect to FIG. 1, in various implementations the detector portion 167 may be included in various types of measurement instruments (e.g., calipers, micrometers, gauges, linear scales, etc.). For example, the detector portion 167 may be fixed to a slide member, and the scale pattern 180 may be fixed to a beam member having a measuring axis that coincides with an x-axis direction. In such a configuration, the slide member may be movably mounted on the beam member and movable along the measuring axis direction MA in a plane that extends along the x-axis direction and a y-axis direction, with a z-axis direction being orthogonal to the plane.

Figure 3:
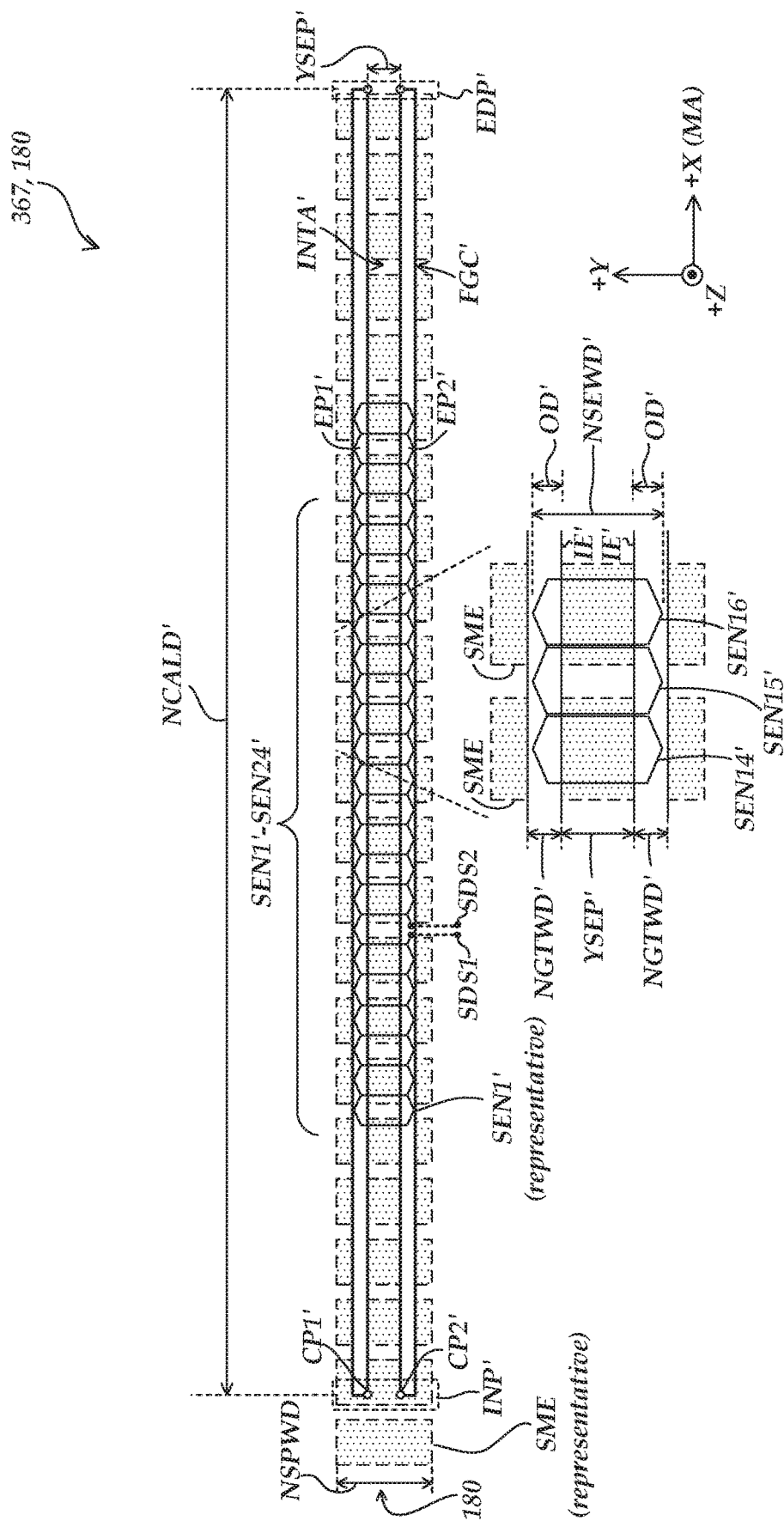
FIG. 3 is a plan view diagram illustrating a second exemplary implementation of a detector portion usable in an electronic position encoder.

FIG. 3 is a plan view diagram illustrating a second exemplary implementation of a detector portion 367 usable as the detector portion 167 in the electronic position encoder shown in FIG. 1, or the like. The detector portion 367 has characteristics and components similar to the detector portion 167 of FIG. 2, and its design and operation are configured to fulfill various design principles disclosed and claimed herein. In particular, the elements designated by "primed" reference numbers in FIG. 3 are analogous to elements having the corresponding similar "unprimed" reference numbers in FIG. 2, and may be understood to operate similarly, except as otherwise indicated below.

The primary difference between the embodiments of FIG. 3 and FIG. 2 is that the detector portion 367 is narrower than the detector portion 167 along the y-axis direction, such that the nominal scale pattern width dimension NSPWD is significantly larger than the nominal sensing element width dimension NSEWD' and other y-axis dimensions of the detector portion 367. For example, in one specific implementation, the nominal sensing element width dimension NSEWD' may be approximately ⅔ or less of the nominal scale pattern width dimension NSPWD. In various implementations, such configurations may result in a greater lateral offset tolerance with respect to a lateral movement of the detector portion 367 relative to the scale pattern 180.

Despite this difference, other features of the detector portion 367 may be analogous to those of the detector portion 167. For example, each of the sensing elements SEN' may have a nominal sensing element width dimension NSEWD' along the y-axis direction, wherein at least a majority of the nominal sensing element width dimension NSEWD' is included within the nominal coil area width dimension YSEP' along the y-axis direction. In various implementations, the field generating coil configuration FGC' includes the first and second elongated portions EP1' and EP2', and an end portion EDP' (e.g., implemented as disclosed with reference to FIGS. 4 and/or 5), all of which may have analogous configurations to the corresponding elements of the detector portion 167. In some implementations, the field generating coil configuration FGC' may be configured such that the nominal trace width dimension NGTWD' is at least 0.10 times, or at least 0.15 times, or at least 0.25 times, or at least 0.50 times the nominal coil area width dimension YSEP'. Other features and/or design relationships may also be made analogous to those described with reference to FIG. 2, if desired.

With respect to the example configurations of the detector portions 167 and 367 that are described above, it will be appreciated that certain prior systems utilized relatively narrower traces and/or relatively larger interior area (e.g., larger area INTA and/or nominal coil area width dimension YSEP) for field generating coil configurations. More specifically, in certain prior systems it was generally considered to be desirable for the related detector portion elements to have a relatively high inductance such that the system would have a high enough Q to resonate for a relatively long period of time, as was considered advantageous with respect to the signal processing and measurement methods that were utilized. In contrast, in accordance with the principles disclosed herein, a wider trace width is utilized (e.g., at the expense of INTA and/or YSEP, for an overall detector y-axis dimension limit imposed by a particular application), which results in a relatively smaller inductance and also a smaller overall impedance, for which a greater amount of current is able to flow in a relatively shorter period of time (e.g., producing a stronger signal), and resonance is still able to be achieved for a desired length of time for a measurement. As noted above with respect to the detector portions 167 and 367, in various implementations each nominal generating trace width dimension NGTWD is at least 0.10 times, or at least 0.15 times, or at least 0.25 times, or at least 0.50 times the nominal coil area width dimension YSEP. As some specific example values, in certain implementations, the nominal coil area width dimension YSEP may be on the order of 2.0 mm, or 8.0 mm, or 10 mm, and each nominal generating trace width dimension NGTWD may be on the order of at least approximately 0.25 mm, or 0.50 mm, or 1.00 mm, or larger. These may be compared with trace widths in certain prior systems that were on the order of 0.10 mm. Configurations such as those disclosed herein have been determined in some instances to achieve detector signal levels that exceed the signal levels of comparable prior art configurations by a factor of 1.5 or more, and in some instances by a factor of 3 or more, when inputting a comparable driving signal to the field generating coil configuration.

With respect to the example configurations of the detector portions 167 and 367, and the like, in various implementations the sensing elements SEN (e.g., area-enclosing loop or coil elements as illustrated in FIGS. 2 and 3) may provide certain advantages (e.g., increased gain, etc.) over more conventional sensing elements, if they are configured in accordance with a maximum signal gain design principle disclosed here, wherein the amount of a sensing element field-receiving area coinciding with or located inside a field generating coil configuration FGC (e.g., in INTA) should be relatively maximized, while the amount of sensing element field-receiving area located outside of the conductors that form a field generating coil configuration FGC (e.g., along the y-axis direction) should be relatively minimized. It will be appreciated that the sensing elements SEN shown in FIGS. 2 and 3 exhibit an overlap dimension OD having design relationships outlined above which conform with this principle. For example, each nominal generating trace width dimension NGTWD is made to be larger than the corresponding overlap dimension OD.

FIG. 4 is an isometric view "wire frame" diagram illustrating a first exemplary implementation of an end portion EDP of a field generating coil configuration FGC included in a detector portion 467, according to principles disclosed and claimed herein. It will be appreciated that the elements of the detector portion 467 may have be designed and operated similarly to the similarly numbered elements of the detector portion 167 of FIG. 2, and may be generally be understood by analogy thereto. The detector portion 467 includes the field generating coil configuration FGC and the plurality of sensing elements SEN1-SEN24 (representative sensing elements SEN17-SEN24 are illustrated in FIG. 4). The field generating coil configuration FGC includes the first and second elongated portions EP1 and EP2 and the end portion EDP and is fixed on a substrate (e.g., substrate 162 of FIG. 1) and surrounds the interior area INTA.

In various implementations, the field generating coil configuration FGC and the sensing elements SEN are insulated from one another, e.g., as located in different layers of a printed circuit board (the layer structure is not explicitly shown in FIG. 4). In FIG. 4, the various labeled Z coordinates may be understood to coincide with or identify respective surfaces of various printed circuit board (PCB) layers, although alternative fabrication methods may be used. The elements SME of the scale pattern 180 reside on a surface of the scale 170 (shown in FIG. 1), at a Z coordinate Zsme. It will be understood that the scale 170 is separate from the printed circuit board (PCB) that carries the elements of the detector portion 467. In the embodiment shown in FIG. 4, the PCB has a front surface (e.g., a front surface of an insulative coating) located at a Z coordinate Zfs. An operating gap exists between the scale element Z coordinate Zsme and the front surface Z coordinate Zfs. The elongated portions EP1 and EP2 may be fabricated on a PCB layer surface having a Z coordinate Zep, and they may be covered by the insulative coating. The sensing elements SEN may comprise interconnected conductive loop portions that reside on respective PCB layer surfaces having Z coordinates ZseL1 and ZseL2. The conductive loop portions may be connected between the layers using feedthroughs, such that the conductors may cross over one another while connecting the sensing elements signal contributions in a serial manner and providing respective signal contribution polarities, as previously outlined.

The first and second elongated portions EP1 and EP2 each extend along the x-axis direction and are nominally located at the elongated portion z distance EPZD=(Zep−Zsme) from the front surface of the PCB of the detector portion 467 that faces the scale pattern 180, along a z-axis direction that is perpendicular to the x-axis and y-axis directions. As noted above, the end portion EDP comprises a conductive path that spans a y-axis direction separation corresponding to the nominal coil area width dimension YSEP between the first and second elongated portions EP1 and EP2 to provide a connection therebetween near an end of the interior area INTA. In the embodiment shown in FIG. 4, the end portion EDP includes a shielded end section SES that resides on a respective PCB layer surface having a Z coordinate Zses, which is nominally located at a shielded end section z distance SESZD=(Zses−Zfs) from the front surface of the PCB of the detector portion 467, wherein the shielded end section z distance SESZD is greater than the elongated portion z distance EPZD. A first connection portion CNP1 (e.g., a PCB feedthrough) connects the first elongated portion EP1 to a first end of the shielded end section SES, and a second connection portion CNP2 (e.g., a PCB feedthrough) connects the second elongated portion EP2 to a second end of the shielded end section SES.

In the implementation shown in FIG. 4, the detector portion 467 further includes a conductive shield region CSR (e.g., a conductive plane region represented by somewhat arbitrarily placed dashed "edge" lines in FIG. 4), extending along the x-axis and y-axis directions and nominally located on a respective PCB layer surface having a Z coordinate Zcsr, which is nominally located at a shield region z distance SRZD=(Zcsr−Zfs) from the front surface of the PCB of the detector portion 467. In various implementations, the shield region z distance SRZD is smaller than the shielded end section z distance SESZD, and the conductive shield region CSR is located between at least part of the shielded end section SES and the front surface of the PCB of the detector portion 467. The conductive shield region CSR may comprise a portion of an extensive ground plane layer in the PCB of the detector portion 467, or it may comprise a discrete region in some embodiments. The conductive shield region CSR may include clearance holes such that the first and second connection portion CNP1 (e.g., PCB feedthroughs) are separated from or insulated from the conductive shield region CSR.

In general, the field components generated by the previously known configurations for the end portions of field generating coil configurations (e.g., end portions that extend along the y-axis direction) have caused error components to arise in the detector signals of the sensing elements closest to them—a so-called "end effect". It has been attempted to mitigate this end effect using "tapered end configurations" in the detector, and/or by spacing the end portions far from the end sensing elements. However, these approaches undesirably reduce signal strength, or increase the detector x-axis dimension, or both. In contrast, the shielding configuration outlined above tends to reduce the field component generated by the end portions and/or prevent it from reaching the signal modulating elements SME. As such, the field component that is coupled to the closest sensing elements is smaller and/or approximately constant regardless of the scale position, thus substantially mitigating any end effect.

As indicated above, in various implementations the elongated portions EP1 and EP2 may be fabricated on a first layer of a printed circuit board, the shielded end section SES may be fabricated on a second layer of the printed circuit board, and the conductive shield region CSR is fabricated on a layer of the circuit board that is closer to the front surface of the detector (e.g., the front surface of a PCB of the detector) than the second layer of the printed circuit board. In one such implementation, the conductive shield region CSR may be fabricated on a layer of the printed circuit board that is located between the first layer and the second layer. In such a configuration, the conductive shield region CSR may comprise at least a portion of a ground plane layer of the printed circuit board, wherein the ground plane layer is located between the first layer and the second layer. In one implementation, a connection (e.g., as part of the first or second connection portions CNP1 or CNP2) between an elongated portion EP1 or EP2 and the shielded end section SES may include a printed circuit board feedthrough that extends along the z-axis direction. In one such configuration, the conductive shield region CSR may be fabricated on a layer of the printed circuit board that is located between the first layer and the second layer, and the printed circuit board feedthrough may pass through an opening fabricated in the conductive shield region CSR.

Figure 5:
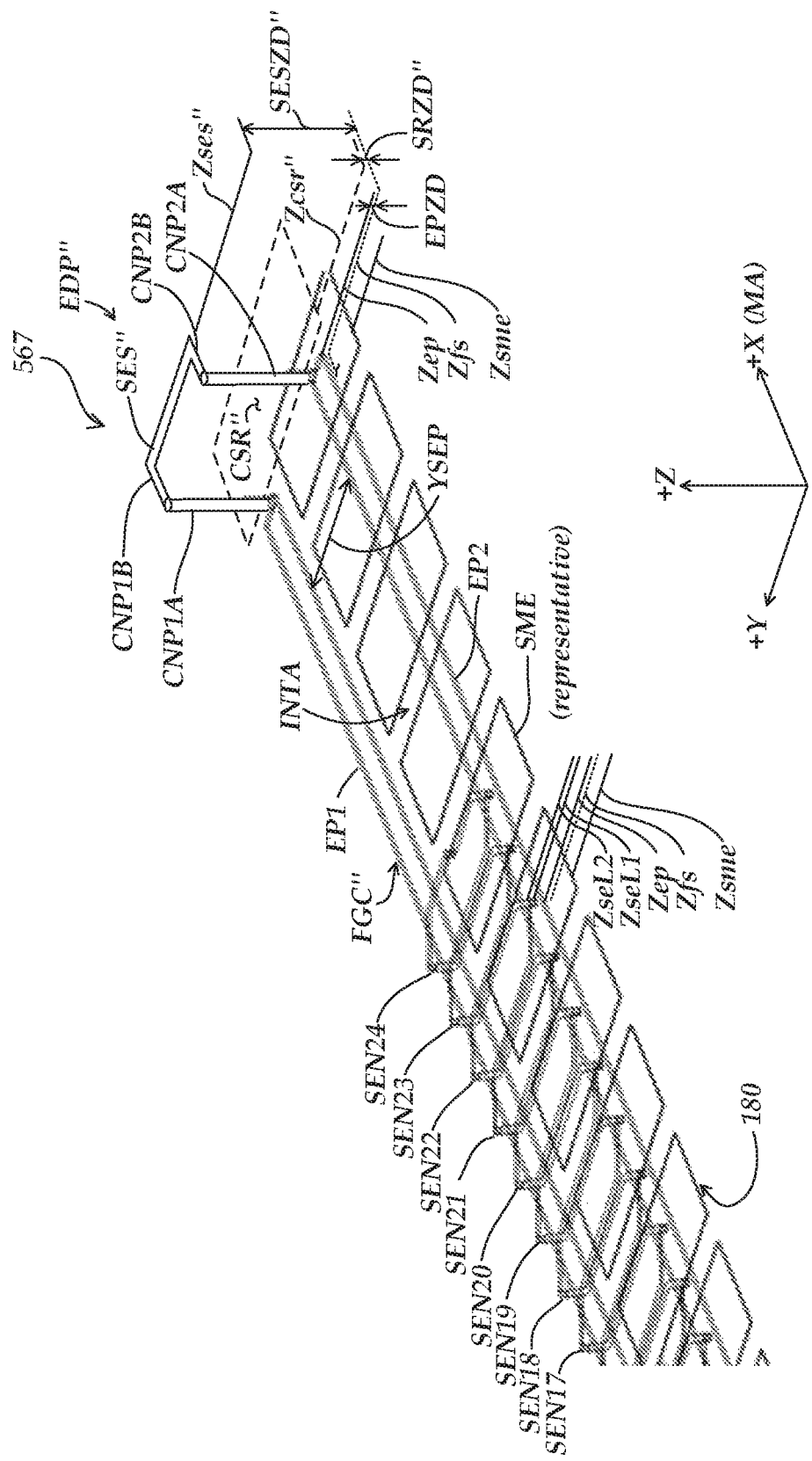
FIG. 5 is an isometric view diagram illustrating a second exemplary implementation of an end portion of a field generating coil configuration of a detector portion.

FIG. 5 is an isometric view "wire frame" diagram illustrating a second exemplary implementation of an end portion EDP'' of a field generating coil configuration FGC'' included in a detector portion 567, according to principles disclosed and claimed herein. It will be appreciated that the elements of the detector portion 567 may be designed and operated similarly to the similarly numbered elements of the detector portion 167 of FIG. 2, and/or the detector portion 467 of FIG. 4, and may be generally understood by analogy thereto.

In FIG. 5, as in FIG. 4, the various labeled Z coordinates may be understood to coincide with or identify respective surfaces of various printed circuit board (PCB) layers, although alternative fabrication methods may be used. The elements SME of the scale pattern 180 reside on a surface of the scale 170 (shown in FIG. 1), at a Z coordinate Zsme. The detector portion 567 has a front surface (e.g., a front surface of an insulative coating on a PCB of the detector portion 567) located at a Z coordinate Zfs. An operating gap exists between the scale element Z coordinate Zsme and the front surface Z coordinate Zfs. The elongated portions EP1 and EP2 may be fabricated on a PCB layer surface having a Z coordinate Zep, and may be covered by the insulative coating. The sensing elements SEN may comprise interconnected conductive loop portions that reside on respective PCB layer surfaces having Z coordinates ZseL1 and ZseL2, connected as previously outlined with reference to the detector portion 467.

The first and second elongated portions EP1 and EP2 are nominally located at the elongated portion z distance EPZD=(Zep−Zsme) from the front surface of the detector portion 567 that faces the scale pattern 180. As in the detector portion 467, the end portion EDP''' comprises a conductive path that spans a y-axis direction separation corresponding to the nominal coil area width dimension YSEP between the first and second elongated portions EP1 and EP2 to provide a connection therebetween near an end of the interior area INTA. In the embodiment shown in FIG. 5, the end portion EDP''' includes a shielded end section SES'' that resides on respective PCB layer surface having a Z coordinate Zses", which is nominally located at a shielded end section z distance SESZD''=(Zses''−Zfs) from the front surface of the detector portion 567, wherein the shielded end section z distance SESZD'' is greater than the elongated portion z distance EPZD. A first connection portion CNP1 (e.g., a comprising a PCB feedthrough CNP1A and a conductive trace CNP1B) connects the first elongated portion EP1 to a first end of the shielded end section SES, and a second connection portion CNP2 (e.g., comprising a PCB feedthrough CNP2A and a conductive trace CNP2B) connects the second elongated portion EP2 to a second end of the shielded end section SES.

In the implementation shown in FIG. 4, the detector portion 567 further includes a conductive shield region CSR'' (e.g., a conductive plane region represented by dashed edge lines in FIG. 5), extending along the x-axis and y-axis directions and nominally located on respective PCB layer surface having a Z coordinate Zcsr", which is nominally located at a shield region z distance SRZD''=(Zcsr''−Zfs) from the front surface of the PCB of the detector portion 467. In various implementations, the shield region z distance SRZD'' is smaller than the shielded end section z distance SESZD'', and the conductive shield region CSR'' is located between at least part of the shielded end section SES'' and the front surface of the PCB of the detector portion 567. For the embodiment shown in FIG. 5, it should be appreciated that in some implementations the shield region CSR" may be located on the same surface as the elongated portions EP1 and EP2, if desired (that is, Zcsr"=Zep and EPZD=SRZD", if desired). Furthermore, in one such implementation, the shielded end section SES" and the conductive traces CNP1B and CNP2B may be located on the same surface(s) used for sensing elements SEN, if desired (that is, Zses"=ZseL1 or Zses"=ZseL2, and so on, if desired). In such implementations, a PCB of the detector portion 567 may comprise fewer layers and/or be thinner along the z-axis direction than the detector portion 467. In any case, the shielded configuration of the end portion EDP" in the detector portion 567 mitigates end effects in a manner analogous to that previously outlined with reference to the end portion EDP in the detector portion 467.

With respect to the example detector portion s 467 and 567 described above, it will be appreciated that the conductive shield region(s) CSR (CSR") may reduce the effect (e.g., related to the changing magnetic flux) of the shielded end section SES on the sensing elements SEN, based at least in part on the relative layer location of the shielded end section SES (e.g., as located on a different PCB layer, etc.) as compared to the layer location of the elongated portions EP1 and EP2 of the field generating coil configuration FGC. Such configurations may enable utilization of conductive shield region(s) CSR (CSR") and allow a shorter overall x-axis dimension for the field generating coil configuration FGC (e.g., for which the end portion EDP does not need to be located as far away from the sensing elements SEN in order to avoid influencing the detector signals that arise in response to the changing magnetic flux, etc.).

Figure 6:
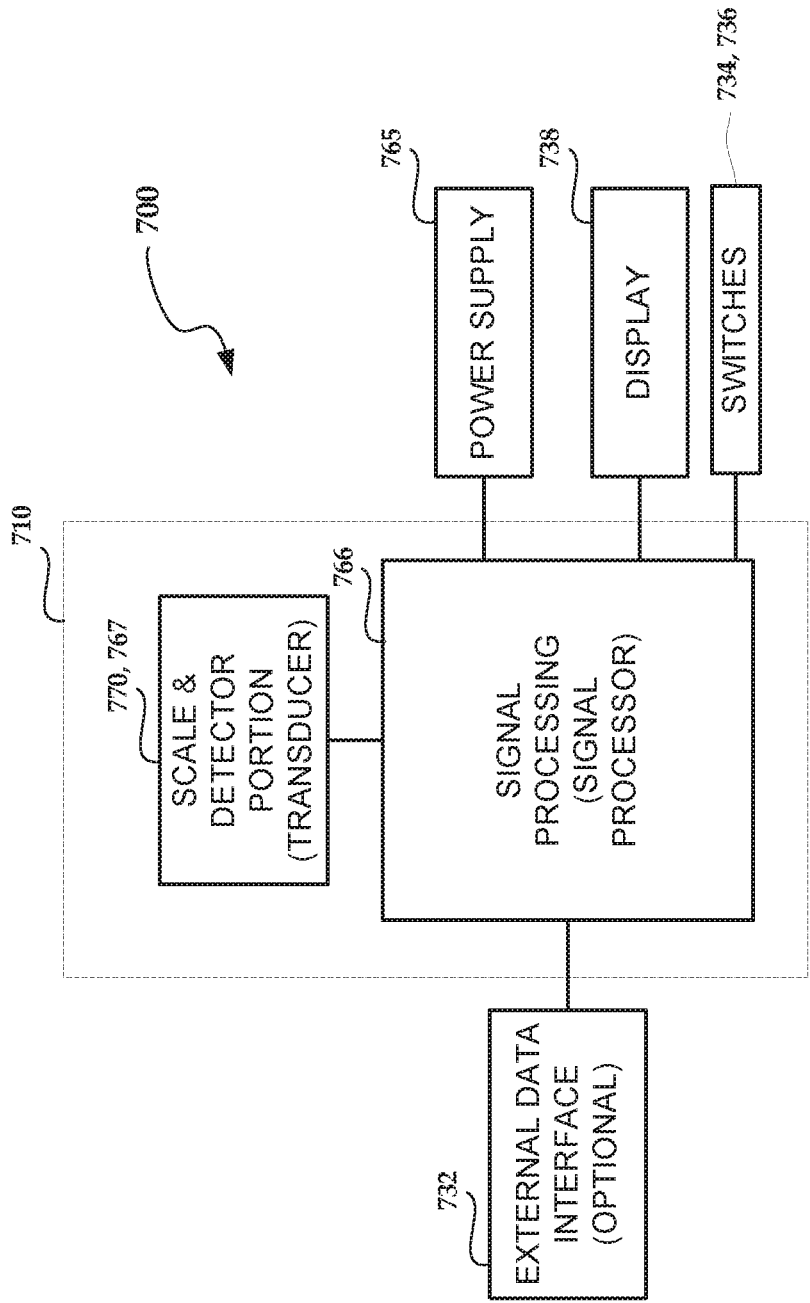
FIG. 6 is a block diagram illustrating one exemplary implementation of components of a measurement system including an electronic position encoder.

FIG. 6 is a block diagram illustrating one exemplary implementation of components of a measurement system 700 including an electronic position encoder 710. It will be appreciated that certain numbered components 7XX of FIG. 6 may correspond to and/or have similar operations as similarly numbered components 1XX of FIG. 1, except as otherwise described below. The electronic position encoder 710 includes a scale 770 and a detector portion 767, which together form a transducer, and a signal processing configuration 766. In various implementations, the detector portion 767 may include any of the configurations described above with respect to FIGS. 2-6, or other configurations. The measurement system 700 also includes user interface features such as a display 738 and user-operable switches 734 and 736, and may additionally include a power supply 765. In various implementations, an external data interface 732 may also be included. All of these elements are coupled to the signal processing configuration 766 (or signal processing and control circuit), which may be embodied as a signal processor. The signal processing configuration 766 determines a position of the sensing elements of the detector portion 767 relative to the scale 770 based on detector signals input from the detector portion 767.

In various implementations, the signal processing configuration 766 of FIG. 6 (and/or the signal processing configuration 166 of FIG. 1) may comprise or consist of one or more processors that execute software to perform the functions described herein. Processors include programmable general-purpose or special-purpose microprocessors, programmable controllers, application-specific integrated circuits (ASICs), programmable logic devices (PLDs), or the like, or a combination of such devices. Software may be stored in memory, such as random-access memory (RAM), read-only memory (ROM), flash memory, or the like, or a combination of such components. Software may also be stored in one or more storage devices, such as optical-based disks, flash memory devices, or any other type of non-volatile storage medium for storing data. Software may include one or more program modules that include routines, programs, objects, components, data structures, and so on that perform particular tasks or implement particular abstract data types. In distributed computing environments, the functionality of the program modules may be combined or distributed across multiple computing systems or devices and accessed via service calls, either in a wired or wireless configuration.

Figure 7:
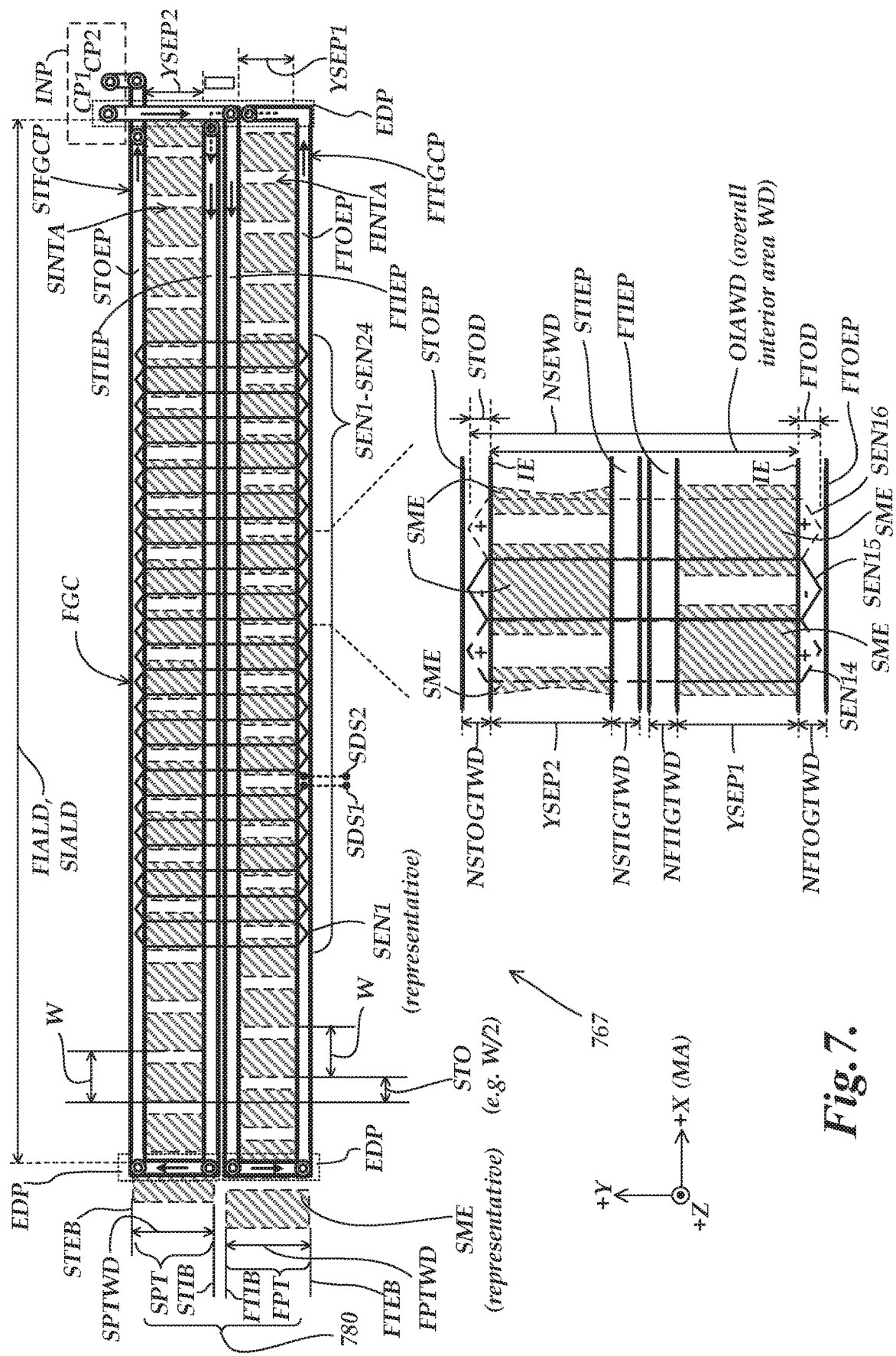
FIG. 7 is a plan view diagram illustrating a third exemplary implementation of a detector portion and a compatible scale pattern usable in an electronic position encoder.

FIG. 7 is a plan view diagram illustrating a third exemplary implementation of a detector portion 767 and a compatible scale pattern 780 usable as the detector portion 167 and the scale pattern 180, respectively, in the electronic position encoder shown in FIG. 1, or the like. The detector portion 767 has characteristics and components similar to the detector portion 167 of FIG. 2, and its design and operation are configured to fulfill various design principles disclosed and claimed herein. In particular, the elements designated by reference numbers or labels in FIG. 7 that are similar or identical to those in FIG. 2 or other figures herein (e.g., similar "XX" suffixes as in 7XX and 2XX) designate analogous elements, and may be understood to operate similarly, except as otherwise indicated below. Therefore, only the significant differences of the detector portion 767 and the scale pattern 780 will be described below. The detector portion 767 and a compatible scale pattern 780 provide additional advantages with regard to providing more robust signal accuracy and or signal strength in comparison to previously described implementations, as described in greater detail further below.

One primary difference between the embodiments of FIG. 7 and FIG. 2 is that the scale pattern 780 comprises a first pattern track FPT and a second pattern track SPT arranged parallel to one another. The first pattern track FPT has a nominal first pattern track width dimension FPTWD along the y-axis direction between a first-track interior boundary FTIB that is closest to the other pattern track and a first-track exterior boundary FTEB that is farthest from the other pattern track. The second pattern track SPT has a nominal second pattern track width dimension SPTWD along the y-axis direction between a second-track interior boundary STIB that is closest to the other pattern track and a second-track exterior boundary STEB that is farthest from the other pattern track. Each of the first and second pattern tracks FPT and SPT comprise signal modulating elements SME that are arranged to provide a spatially varying characteristic which changes as a periodic function of position along the x-axis direction.

Another primary difference is that the detector portion 767 is configured for compatible operation with the scale pattern 780. The detector portion 767 comprises a field generating coil configuration FGC, which may be fixed on a substrate and comprises a first-track field generating coil portion FTFGCP and a second-track field generating coil portion STFGCP. The field generating coil configuration FGC may comprise an input portion INP comprising at least two connection portions (e.g., CP1 and CP2) that connect a coil drive signal from a signal processing configuration to the field generating coil configuration FGC. In the field generating coil configuration FGC, the first-track field generating coil portion FTFGCP surrounds a first interior area FINTA aligned with the first pattern track FPT and has a nominal first interior area length dimension FIALD along the x-axis direction and a nominal first interior area width dimension YSEP1 along the y-axis direction and generates a changing first magnetic flux in the first interior area FINTA in response to a coil drive signal. Similarly, the second-track field generating coil portion STFGCP surrounds a second interior area SINTA aligned with the second pattern track SPT and has a nominal second interior area length dimension SIALD along the x-axis direction and a nominal second interior area width dimension YSEP2 along the y-axis direction and generates a changing second magnetic flux in the second interior area SINTA in response to a coil drive signal.

The detector portion 767 also comprises a plurality of sensing elements SEN (e.g., SEN1, SEN14) arranged along the x-axis direction and fixed on a substrate, each of the sensing elements SEN having a nominal sensing element width dimension NSEWD along the y-axis direction that spans the first and second interior areas FINTA and SINTA, wherein the plurality of sensing elements are configured to provide detector signals which respond to a local effect on the changing magnetic flux provided by adjacent signal modulating elements SME of the scale pattern 780. In various implementations, the plurality of sensing elements SEN comprise magnetic flux sensing loops formed by conductive traces and feedthroughs fabricated on a printed circuit board. In various implementations (e.g., as shown in FIG. 7) magnetic flux sensing loops configured to provide a first sensing loop polarity (e.g., that responds to a changing magnetic flux of a first polarity to produce a current in first direction) are interleaved along the x-axis direction with magnetic flux sensing loops configured to provide a second sensing loop polarity opposite to the first sensing loop polarity (e.g., that responds to a changing magnetic flux opposite to the first polarity to produce a current in same direction). A signal processing configuration may be operably connected to the detector portion to provide the coil drive signal and determine the relative position between the detector portion and the scale pattern based on detector signals input from the illustrated sensing elements SEN (and from other non-illustrated sensing elements SEN provided at other spatial phase positions, according to known principles) of the detector portion 767, according to known methods.

As shown in FIG. 7, the field generating coil configuration FGC and the sensing elements SEN are advantageously configured according to principles previously disclosed herein. The field generating coil configuration FGC may include one or more of the illustrated feedthroughs to implement a shielded configuration for one or more of the end portions EDP. It will be understood that illustrated feedthroughs that are not needed or desired in a particular implementation may be omitted.

In the implementation shown in FIG. 7, the first-track inside and outside elongated portions FTIEP and FTOEP, respectively, extend along the x-axis direction adjacent to the first interior area FINTA. The first-track inside elongated portion FTIEP is located adjacent to the first-track interior boundary FTIB and the first-track outside elongated portion FTOEP is located adjacent to the first-track exterior boundary FTEB. The first-track inside elongated portion FTIEP has a nominal first-track inside generating trace width dimension NFTIGTWD along the y-axis direction. The first-track outside elongated portion FTOEP has a nominal first-track outside generating trace width dimension NFTOGTWD along the y-axis direction. According to principles disclosed herein, each of the nominal first-track generating trace width dimensions NFTIGTWD and NFTOGTWD (which may be the same, or different from each other) are at least 0.1 times the nominal first interior area width dimension YSEP1. In some implementations, it may be advantageous if the first-track generating trace width dimensions NFTIGTWD and NFTOGTWD are least 0.15 times, or at least 0.25 times, or at least 0.50 times the nominal first interior area width dimension YSEP1.

The second-track inside and outside elongated portions STIEP and STOEP, respectively, extend along the x-axis direction adjacent to the second interior area SINTA. The second-track inside elongated portion STIEP is located adjacent to the second-track interior boundary STIB and the second-track outside elongated portion STOEP is located adjacent to the second-track exterior boundary STEB. The second-track inside elongated portion STIEP has a nominal second-track inside generating trace width dimension NSTIGTWD along the y-axis direction. The second-track outside elongated portion STOEP has a nominal second-track outside generating trace width dimension NSTOGTWD along the y-axis direction. According to principles disclosed herein, each of the nominal second-track generating trace width dimensions NSTIGTWD and NSTOGTWD (which may be the same, or different from each other) are at least 0.1 times the nominal second interior area width dimension YSEP2. In some implementations, it may be advantageous if the second-track generating trace width dimensions NSTIGTWD and NSTOGTWD are least 0.15 times, or at least 0.25 times, or at least 0.50 times the nominal second interior area width dimension YSEP2. Other features and/or design relationships may also be made analogous to those described with reference to FIG. 2, if desired.

In various implementations, in combination with the features outlined above, at least a majority of the nominal sensing element width dimensions NSEWD are included between the first-track outside elongated portion FTOEP and the second-track outside elongated portion STOEP. In some implementations, at least a majority of the nominal sensing element width dimension NSEWD is included within the first and second interior areas FINTA and SINTA. In various implementations, the field generating coil configuration FGC and the sensing elements SEN are insulated from one another. As illustrated in FIG. 7, the nominal sensing element width dimension NSEWD of at least one sensing element SEN is greater than an overall interior area width dimension OIAWD spanning between the first-track outside elongated portion FTOEP and the second-track outside elongated portion STOEP and extends beyond an interior edge IE of at least one of the first-track outside elongated portion FTOEP and the second-track outside elongated portion STOEP by an amount defined as an overlap dimension (e.g., the first-track overlap dimension FTOD and/or the second-track overlap dimension STOD, respectively). In various implementations, the field generating coil configuration FGC is configured such that each nominal outside generating trace width dimension (NFTOGTWD and NSTOGTWD) is larger than its associated overlap dimension. In various implementations, all elongated portions (FTIEP, FTOEP, STIEP and STOEP) are fabricated in a first layer of a printed circuit board, and the sensing elements SEN comprise conductive loops fabricated in one or more layers of the printed circuit board that include a layer different than the first layer, at least in a vicinity of the overlap dimensions.

In the particular implementation illustrated in FIG. 7, the first and second pattern tracks FPT and SPT may each comprise the same type of signal modulating elements SME arranged according to a same spatial period or wavelength W along the x-axis direction in the first and second pattern tracks FPT and SPT. The signal modulating elements SME in the second pattern track SPT are offset along the measuring axis direction (the X-axis direction) by a nominal scale track offset STO of approximately W/2 relative to the signal modulating elements in the first pattern track. As indicated by the current flow arrows in FIG. 7, the field generating coil configuration FGC is configured to generate a first-track changing magnetic flux with a first polarity in the first interior area FINTA, and generate a second-track changing magnetic flux with a second polarity that is opposite to the first polarity in the second interior area SINTA. As previously outlined, the plurality of sensing elements SEN comprise magnetic flux sensing loops (alternating in sensing loop polarity along the x-axis direction) formed by conductive traces fabricated on a printed circuit board, wherein at least a majority of the magnetic flux sensing loops each span the first and second interior areas FINTA and SINTA along the y-axis direction and within each sensing element SEN provide the same sensing loop polarity in the first and second interior areas FINTA and SINTA. Since the generated magnetic flux polarity within the first interior area FINTA is opposite to the generated magnetic flux polarity within the second interior area SINTA, this interacts with the signal modulating elements SME having the scale track offset STO of approximately W/2 in the first and second pattern tracks FPT and SPT to produce reinforcing signal contributions in each of the sensing elements SEN.

Figure 8:
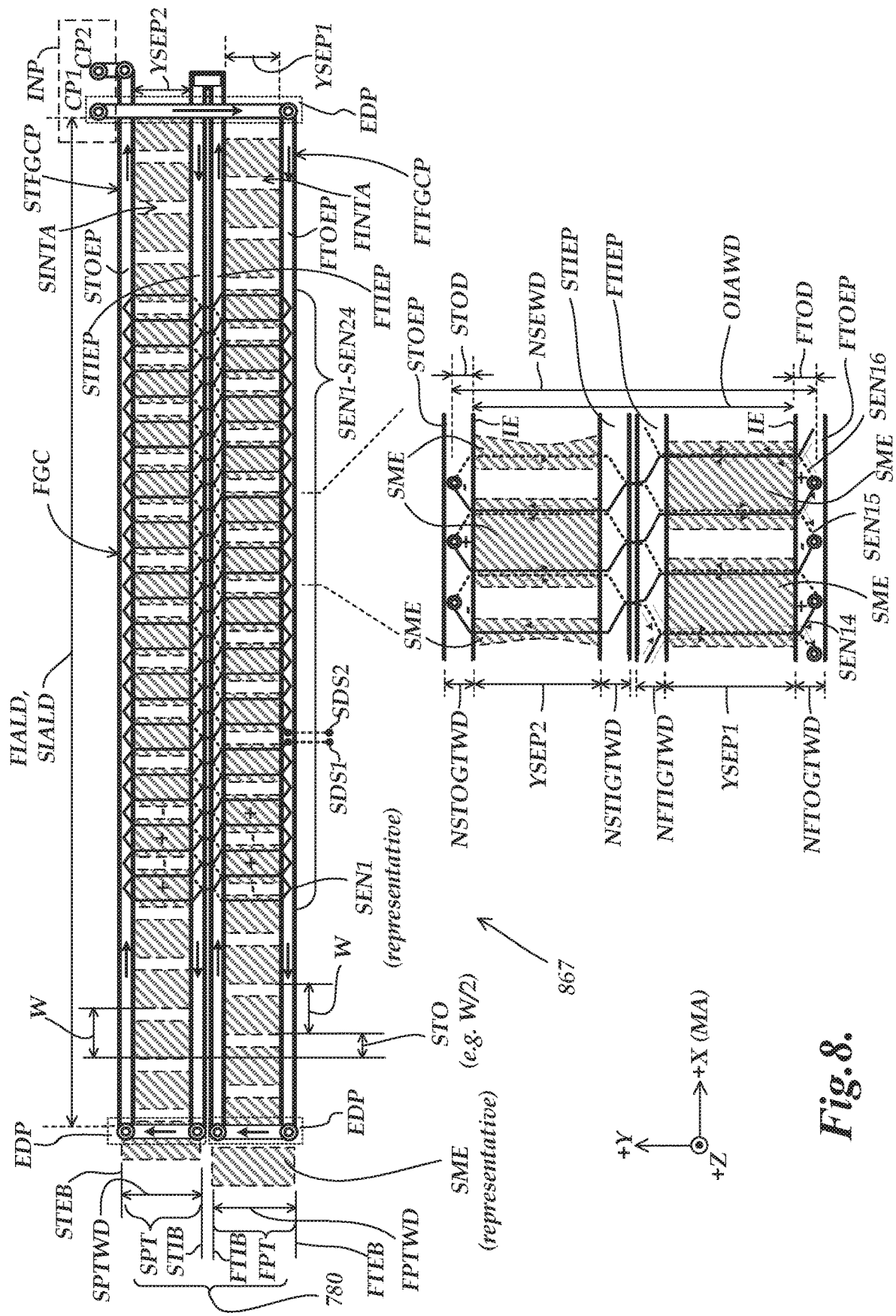
FIG. 8 is a plan view diagram illustrating a fourth exemplary implementation of a detector portion and a compatible scale pattern usable in an electronic position encoder.

FIG. 8 is a plan view diagram illustrating a fourth exemplary implementation of a detector portion 867 and a compatible scale pattern 780 usable as the detector portion 167 and the scale pattern 180, respectively, in the electronic position encoder shown in FIG. 1, or the like. The scale pattern 780 shown in FIG. 8 may be similar or identical to the scale pattern 780 shown FIG. 7, and will not be described in greater detail below, except in relation to its operation with the detector portion 867. The detector portion 867 has characteristics and components analogous to those of the detector portion 767 of FIG. 7, and its design and operation are configured to fulfill similar design principles disclosed and claimed herein, and provide similar advantages. The elements designated by reference numbers or labels in FIG. 8 that are similar or identical to those in FIG. 7 or other figures herein (e.g., similar "XX" suffixes as in 8XX and 7XX) designate analogous elements, and may be understood to operate similarly, except as otherwise indicated below. Therefore, only the significant differences of the detector portion 867 and the detector portion 767 will be described in detail below.

Similarly to the detector portion 767, the detector portion 867 is configured for compatible operation with the scale pattern 780. The first-track field generating coil portion FTFGCP surrounds a first interior area FINTA aligned with the first pattern track FPT, and has a nominal first interior area length dimension FIALD along the x-axis direction and a nominal first interior area width dimension YSEP1 along the y-axis direction, and generates a changing first magnetic flux in the first interior area FINTA in response to a coil drive signal. Similarly, the second-track field generating coil portion STFGCP surrounds a second interior area SINTA aligned with the second pattern track SPT and has a nominal second interior area length dimension SIALD along the x-axis direction and a nominal second interior area width dimension YSEP2 along the y-axis direction and generates a changing second magnetic flux in the second interior area SINTA in response to a coil drive signal.

One significant difference between the detector portion 867 and the detector portion 767 is that, as indicated by the current flow arrows in FIG. 8, the field generating coil configuration FGC is configured to generate a first-track changing magnetic flux with a first polarity in the first interior area FINTA, and generate a second-track changing magnetic flux with a second polarity that is the same as the first polarity in the second interior area SINTA. Related to this is a second significant difference, in the plurality of sensing elements SEN (e.g., SEN1, SEN14), as described below.

Similarly to the detector portion 767, in the detector portion 867 the plurality of sensing elements SEN have a nominal sensing element width dimension NSEWD along the y-axis direction that spans the first and second interior areas FINTA and SINTA, and the plurality of sensing elements SEN are configured to provide detector signals which respond to a local effect on the changing magnetic flux provided by adjacent signal modulating elements SME of the scale pattern 780. The plurality of sensing elements SEN comprise magnetic flux sensing loops formed by conductive traces fabricated on a printed circuit board, wherein at least a majority of the magnetic flux sensing loops each span the first and second interior areas FINTA and SINTA along the y-axis direction. However, in contrast to the detector portion 767, the magnetic flux sensing loops illustrated in the detector portion 867 each include a cross over or twisting of their conductive traces to provide opposite sensing loop polarities in the first interior area FINTA and second interior area SINTA. In various embodiments, for at least a majority of the magnetic flux sensing loops, the cross over or twisting of their conductive traces is located in or over an "inactive" central region including the first-track inside elongated portion FTIEP and second-track inside elongated portion STIEP between the first interior area FINTA and the second interior area SINTA, to avoid creating an undesirable signal disturbance.

As shown in FIG. 8, the magnetic flux sensing loops of the sensing elements SEN are furthermore configured to have opposite sensing loop polarities interleaved along the x-axis direction (e.g., as schematically indicated by one exemplary sensing loop conductor diagram and the associated current flow arrows shown in the expanded section in the lower portion of FIG. 8.)

According to the description above, since the generated magnetic flux polarity within the first interior area FINTA is the same as the generated magnetic flux polarity within the second interior area SINTA, this interacts with the signal modulating elements SME having the scale track offset STO of approximately W/2 in the first and second pattern tracks FPT and SPT to produce reinforcing signal contributions in each of the "twisted" sensing elements SEN. A signal processing configuration may be operably connected to the detector portion to provide the coil drive signal and determine the relative position between the detector portion and the scale pattern based on detector signals input from the illustrated sensing elements SEN (and from other non-illustrated sensing elements SEN provided at other spatial phase positions, according to known principles) of the detector portion 867, according to known methods.

As shown in FIG. 8, the field generating coil configuration FGC and the sensing elements SEN are advantageously configured according to principles previously disclosed herein. The field generating coil configuration FGC may include one or more of the illustrated feedthroughs to implement a shielded configuration for one or more of the end portions EDP. It will be understood that illustrated feedthroughs that are not needed or desired in a particular implementation may be omitted. According to principles disclosed herein, each of the nominal first-track generating trace width dimensions NFTIGTWD and NFTOGTWD are at least 0.1 times the nominal first interior area width dimension YSEP1. In some implementations, it may be advantageous if the first-track generating trace width dimensions NFTIGTWD and NFTOGTWD are least 0.15 times, or at least 0.25 times, or at least 0.50 times the nominal first interior area width dimension YSEP1. According to principles disclosed herein, each of the nominal second-track generating trace width dimensions NSTIGTWD and NSTOGTWD are at least 0.1 times the nominal second interior area width dimension YSEP2. In some implementations, it may be advantageous if the second-track generating trace width dimensions NSTIGTWD and NSTOGTWD are least 0.15 times, or at least 0.25 times, or at least 0.50 times the nominal second interior area width dimension YSEP2.

Other features and/or design relationships used in the detector portion 867 may also be made analogous to compatible features and/or design relationships described with reference to the detector portion 767, if desired.

A two-track scale pattern used in combination with field generation polarities and sensing element polarities similar to those outlined above with reference to FIG. 7 and FIG. 8 may help reduce or eliminate certain signal offset components that may otherwise arise in single track scale pattern configurations, as disclosed without reference to detailed fabrication or layout consideration in the '958 patent, which was previously incorporated herein by reference. As previously indicated herein, prior systems (e.g., those referenced in the '958 patent) utilized relatively narrower traces and/or relatively larger interior area (e.g., larger interior areas FINTA and/or SINTA and/or nominal coil area width dimensions YSEP1 and/or YSEP2) for field generating coil configurations. In certain prior systems it was generally considered to be desirable for the detector sensing elements to have a relatively large area coupled to receive the changing magnetic flux in a generating coil interior area, as was considered advantageous with respect to current flow and signal strength. In contrast, in accordance with the principles disclosed herein, a wider trace width is utilized (e.g., at the expense of the interior areas FINTA and/or SINTA and/or YSEP1 and/or YSEP2, for an overall detector y-axis dimension limit imposed by a particular application), which results in a relatively smaller overall impedance for the field generating coil configuration FGC, for which a greater amount of current is able to flow in a relatively shorter period of time (e.g., producing a stronger signal), and resonance is still able to be achieved for a desired length of time for a measurement. This is particularly valuable with respect to two-track scale patterns, which may be limited to relatively small first track pattern width and second track pattern width due to practical considerations (e.g., to fit into the same space as previously utilized single track encoders). Two-track configurations configured according to the principles disclosed herein have been determined in some instances to achieve detector signal levels that exceed the signal levels of comparable prior art configurations by a factor of 1.5 or more, and in some instances by a factor of 3 or more, when inputting a comparable driving signal to the field generating coil configuration.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein.

As one example, the embodiments shown and described with reference to FIGS. 2 and 3 and 7 and 8 utilize an overlap dimension OD which is non-zero, but this is not a requirement in all embodiments. As another example, the particular configurations of the sensing elements SEN and the scale track offset STO illustrated in FIGS. 7 and 8 are exemplary only, and not limiting. Other scale track offsets STO may be used in combination with suitable adaptations in the shape of the sensing elements SEN to accommodate a particular amount of scale track offset, as may be understood by one skilled in the art based on the description and principles disclosed above. As another example, it will be appreciated that the signal modulating elements SME may comprise loop elements or plate elements, or material property variation, in various implementations, and/or may have a dimension along the x-axis direction of W/2, or more or less than W/2, to produce a desired periodic signal profile in various implementations. As another example, it will be appreciated that various features and principles disclosed herein may be applied to rotary position encoders, wherein a circular measuring axis direction and a radial direction are analogous to the x-axis direction and y-axis direction referred to in the description above.

The various implementations and features described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. An electronic position encoder usable to measure a relative position between two elements along a measuring axis direction that coincides with an x-axis direction, the electronic position encoder comprising:
   a scale extending along the measuring axis direction and including a signal modulating scale pattern comprising first and second pattern tracks arranged parallel to one another, each pattern track having a track width dimension along a y-axis direction that is perpendicular to the x-axis direction between its interior boundary that is closest to the other pattern track and its exterior boundary that is farthest from the other pattern track, and each pattern track comprising signal modulating elements that are arranged to provide a spatially varying characteristic which changes as a periodic function of position along the x-axis direction;
   a detector portion configured to be mounted proximate to the pattern tracks and to move along the measuring axis direction relative to the pattern tracks, the detector portion comprising:
      a field generating coil configuration fixed on a substrate, comprising:
         a first-track field generating coil portion comprising first-track inside and outside elongated portions, the first-track field generating coil portion surrounding a first interior area aligned with the first pattern track and having a nominal first interior area length dimension along the x-axis direction and a nominal first interior area width dimension along the y-axis direction, the nominal first interior area width dimension extending from the first-track inside elongated portion to the first-track outside elongated portion, the first-track field generating coil portion generating a changing first magnetic flux in the first interior area in response to a coil drive signal, and a second-track field generating coil portion comprising second-track inside and outside elongated portions, the second-track field generating coil portion surrounding a second interior area aligned with the second pattern track and having a nominal second interior area length dimension along the x-axis direction and a nominal second interior area width dimension along the y-axis direction, the nominal second interior area width dimension extending from the second-track inside elongated portion to the second-track outside elongated portion, the second-track field generating coil portion generating a changing magnetic flux in the second interior area in response to the coil drive signal; and a plurality of sensing elements arranged along the x-axis direction and fixed on the substrate, each of the sensing elements having a nominal sensing element width dimension along the y-axis direction that spans the first and second interior areas, wherein the plurality of sensing elements are configured to provide detector signals which respond to a local effect on the changing magnetic flux provided by adjacent signal modulating elements of the scale pattern; and a signal processing configuration that is operably connected to the detector portion to provide the coil drive signal and that determines the relative position between the detector portion and the scale pattern based on detector signals input from the detector portion, wherein:

the field generating coil configuration comprises:

an input portion comprising at least two connection portions that connect the coil drive signal from the signal processing configuration to the field generating coil configuration;

the first-track inside and outside elongated portions extending along the x-axis direction adjacent to the first interior area, the first-track inside elongated portion located adjacent to the first-track interior boundary and the first-track outside elongated portion located adjacent to the first-track exterior boundary, the first-track inside and outside elongated portions each comprising a conductive trace having a nominal first-track generating trace width dimension along the y-axis direction; and the second-track inside and outside elongated portions extending along the x-axis direction adjacent to the second interior area, the second-track inside elongated portion located adjacent to the second-track interior boundary and the second-track outside elongated portion located adjacent to the second-track exterior boundary, the second-track inside and outside elongated portions each comprising a conductive trace having a nominal second-track generating trace width dimension along the y-axis direction;

at least a majority of the nominal sensing element width dimension is included between the first-track outside elongated portion and the second-track outside elongated portion, and the field generating coil configuration is configured such that each nominal first-track generating trace width dimension is at least 0.1 times the nominal first interior area width dimension, and each nominal second-track generating trace width dimension is at least 0.1 times the nominal second interior area width dimension.

2. The electronic position encoder of claim 1, wherein each nominal first-track generating trace width dimension is at least 0.15 times the nominal first interior area width dimension and each nominal second-track generating trace width dimension is at least 0.15 times the nominal second interior area width dimension.

3. The electronic position encoder of claim 2, wherein each nominal first-track generating trace width dimension is at least 0.25 times the nominal first interior area width dimension and each nominal second-track generating trace width dimension is at least 0.25 times the nominal second interior area width dimension.

4. The electronic position encoder of claim 2, wherein each nominal first-track generating trace width dimension is at least 0.5 times the nominal first interior area width dimension and each nominal second-track generating trace width dimension is at least 0.5 times the nominal second interior area width dimension.

5. The electronic position encoder of claim 1, wherein each nominal first-track and second-track generating trace width dimension is at least 25 times a skin depth of the elongated portions at a nominal operating frequency defined corresponding to the detector signals that arise in response to the changing magnetic flux.

6. The electronic position encoder of claim 1, wherein:

the field generating coil configuration and the sensing elements are insulated from one another;

the sensing element width dimension of at least one sensing element is greater than a dimension spanning between the first-track outside elongated portion and the second-track outside elongated portion and extends beyond an interior edge of at least one of the first-track outside elongated portion and the second-track outside elongated portion by an amount defined as an overlap dimension; and the field generating coil configuration is configured such that each nominal generating trace width dimension is larger than the overlap dimension.

7. The electronic position encoder of claim 6, wherein the elongated portions are fabricated in a first layer of a printed circuit board, and the sensing elements comprise conductive loops fabricated in one or more layers of the printed circuit board that include a layer different than the first layer, at least in a vicinity of the overlap dimension.

8. The electronic position encoder of claim 1, wherein at least a majority of the nominal sensing element width dimension is included within the first and second interior areas.

9. The electronic position encoder of claim 1, wherein the substrate comprises a printed circuit board, and at least the field generating coil configuration comprises conductive traces fabricated on the printed circuit board.

10. The electronic position encoder of claim 1, wherein the interior track boundaries of the first and second pattern tracks are located proximate to one another.

11. The electronic position encoder of claim 1, wherein:
the first and second pattern tracks each comprise the same type of signal modulating elements that are arranged according to a same spatial period or wavelength W along the x-axis direction in the first and second pattern tracks, wherein the signal modulating elements in the second pattern track are offset along the measuring axis direction by a nominal scale track offset of approximately W/2 relative to the signal modulating elements in the first pattern track;
the field generating coil configuration is configured to generate the first-track changing magnetic flux with a first polarity in the first interior area, and generate the second-track changing magnetic flux with a second polarity that is opposite to the first polarity in the second interior area; and
the plurality of sensing elements comprise magnetic flux sensing loops formed by conductive traces fabricated on a printed circuit board, wherein at least a majority of the magnetic flux sensing loops each span the first and second interior areas along the y-axis direction and provide the same sensing loop polarity in the first and second interior areas.

12. The electronic position encoder of claim 1, wherein:
the first and second pattern tracks each comprise the same type of signal modulating elements that are arranged according to a same spatial period or wavelength W along the x-axis direction in the first and second pattern tracks, wherein the signal modulating elements in the second pattern track are offset along the measuring axis direction by a nominal scale track offset of approximately W/2 relative to the signal modulating elements in the first pattern track;
the field generating coil configuration is configured to generate the first-track changing magnetic flux with a first polarity in the first interior area, and generate the second-track changing magnetic flux with a second polarity that is the same as the first polarity in the second interior area; and
the plurality of sensing elements comprise magnetic flux sensing loops formed by conductive traces fabricated on a printed circuit board, wherein at least a majority of the magnetic flux sensing loops each span the first and second interior areas along the y-axis direction and include a cross over or twisting of their conductive traces to provide opposite sensing loop polarities in the first and second interior areas.

13. The electronic position encoder of claim 12, wherein for at least a majority of the magnetic flux sensing loops, the cross over or twisting of their conductive traces is located in a region including the first-track inside elongated portion and the second-track inside elongated portion between the first interior area and the second interior area.

14. The electronic position encoder of claim 1, wherein the first-track field generating coil portion and the second-track field generating coil portion each comprises a single turn surrounding their interior area.

15. An electronic position encoder usable to measure a relative position between two elements along a measuring axis direction that coincides with an x-axis direction, the electronic position encoder comprising:
a scale extending along the measuring axis direction and including a signal modulating scale pattern comprising first and second pattern tracks arranged parallel to one another, each pattern track having a track width dimension along a y-axis direction that is perpendicular to the x-axis direction between its interior boundary that is closest to the other pattern track and its exterior boundary that is farthest from the other pattern track, and each pattern track comprising signal modulating elements that are arranged to provide a spatially varying characteristic which changes as a periodic function of position along the x-axis direction;
a detector portion configured to be mounted proximate to the pattern tracks and to move along the measuring axis direction relative to the pattern tracks, the detector portion comprising:
a field generating coil configuration fixed on a substrate, comprising:
a first-track field generating coil portion surrounding a first interior area aligned with the first pattern track and having a nominal first interior area length dimension along the x-axis direction and a nominal first interior area width dimension along the y-axis direction and generating a changing first magnetic flux in the first interior area in response to a coil drive signal, and
a second-track field generating coil portion surrounding a second interior area aligned with the second pattern track and having a nominal second interior area length dimension along the x-axis direction and a nominal second interior area width dimension along the y-axis direction and generating a changing magnetic flux in the second interior area in response to the coil drive signal; and
a plurality of sensing elements arranged along the x-axis direction and fixed on the substrate, each of the sensing elements having a nominal sensing element width dimension along the y-axis direction that spans the first and second interior areas, wherein the plurality of sensing elements are configured to provide detector signals which respond to a local effect on the changing magnetic flux provided by adjacent signal modulating elements of the scale pattern; and
a signal processing configuration that is operably connected to the detector portion to provide the coil drive signal and that determines the relative position between the detector portion and the scale pattern based on detector signals input from the detector portion,
wherein:
the field generating coil configuration comprises:
an input portion comprising at least two connection portions that connect the coil drive signal from the signal processing configuration to the field generating coil configuration;
first-track inside and outside elongated portions extending along the x-axis direction adjacent to the first interior area, the first-track inside elongated portion located adjacent to the first-track interior boundary and the first-track outside elongated portion located adjacent to the first-track exterior boundary, the first-track inside and outside elongated portions each having a nominal first-track generating trace width dimension along the y-axis direction; and
second-track inside and outside elongated portions extending along the x-axis direction adjacent to the second interior area, the second-track inside elongated portion located adjacent to the second-track interior boundary and the second-track outside elongated portion located adjacent to the second-track exterior boundary, the second-track inside and outside elongated portions each having a nominal second-track generating trace width dimension along the y-axis direction;

at least a majority of the nominal sensing element width dimension is included between the first-track outside elongated portion and the second-track outside elongated portion;

the field generating coil configuration is configured such that each nominal first-track generating trace width dimension is at least 0.1 times the nominal first interior area width dimension, and each nominal second-track generating trace width dimension is at least 0.1 times the nominal second interior area width dimension;

the field generating coil configuration further comprises at least one shielded end portion that extends generally along the y-axis direction and connects to at least one elongated portion that is nominally located at an elongated portion z distance from a front surface of the detector portion that faces the scale pattern, along a z axis direction that is perpendicular to the x-axis and y-axis directions, wherein that shielded end portion comprises:

a shielded end section that is nominally located at a shielded end section z distance from the front surface of the detector portion, wherein the shielded end section z distance is greater than the elongated portion z distance; and the detector portion further comprises a conductive shield region extending along the x-axis and y-axis directions and nominally located at a shield region z distance from the front surface, wherein the shield region z distance is smaller than the shielded end section z distance, and the shield region is located between at least part of the shielded end section and the front surface of the detector portion.

16. The electronic position encoder of claim 15, wherein the at least one shielded end portion includes a first-track shielded end portion that connects the first-track inside and outside elongated portions, and a second-track shielded end portion that connects the second-track inside and outside elongated portions.

17. The electronic position encoder of claim 15, wherein the elongated portions are fabricated in a first layer of a printed circuit board, the shielded end section is fabricated in a second layer of the printed circuit board, and the shield region is fabricated in a layer of the circuit board that is closer to the front surface than the second layer of the printed circuit board.

18. The electronic position encoder of claim 17, wherein the shield region is fabricated in a layer of the printed circuit board that is located between the first layer and the second layer.

19. The electronic position encoder of claim 15, wherein a connection between an elongated portion and the shielded end section comprises a printed circuit board feedthrough that extends along the z-axis direction.

20. The electronic position encoder of claim 19, wherein the shield region is fabricated in a layer of the printed circuit board that is located between the first layer and the second layer, and the printed circuit board feedthrough passes through an opening fabricated in the shield region.

21. A measurement system configured to operate in conjunction with a scale, the scale extending along a measuring axis direction that coincides with an x-axis direction and including a signal modulating scale pattern comprising first and second pattern tracks arranged parallel to one another, each pattern track having a track width dimension along a y-axis direction that is perpendicular to the x-axis direction between its interior boundary that is closest to the other pattern track and its exterior boundary that is farthest from the other pattern track, and each pattern track comprising signal modulating elements that are arranged to provide a spatially varying characteristic which changes as a periodic function of position along the x-axis direction, the measurement system comprising:

a detector portion configured to be mounted proximate to the pattern tracks and to move along the measuring axis direction relative to the pattern tracks, the detector portion comprising:

a field generating coil configuration fixed on a substrate, comprising:

a first-track field generating coil portion comprising first-track inside and outside elongated portions, the first-track field generating coil portion surrounding a first interior area aligned with the first pattern track and having a nominal first interior area length dimension along the x-axis direction and a nominal first interior area width dimension along the y-axis direction, the nominal first interior area width dimension extending from the first-track inside elongated portion to the first-track outside elongated portion, the first-track field generating coil portion generating a changing first magnetic flux in the first interior area in response to a coil drive signal, and a second-track field generating coil portion comprising second-track inside and outside elongated portions, the second-track field generating coil portion surrounding a second interior area aligned with the second pattern track and having a nominal second interior area length dimension along the x-axis direction and a nominal second interior area width dimension along the y-axis direction, the nominal second interior area width dimension extending from the second-track inside elongated portion to the second-track outside elongated portion, the second-track field generating coil portion generating a changing magnetic flux in the second interior area in response to the coil drive signal; and a plurality of sensing elements arranged along the x-axis direction and fixed on the substrate, each of the sensing elements having a nominal sensing element width dimension along the y-axis direction that spans the first and second interior areas, wherein the plurality of sensing elements are configured to provide detector signals which respond to a local effect on the changing magnetic flux provided by adjacent signal modulating elements of the scale pattern; and a signal processing configuration that is operably connected to the detector portion to provide the coil drive signal and that determines the relative position between the detector portion and the scale pattern based on detector signals input from the detector portion, wherein:

the field generating coil configuration comprises:

an input portion comprising at least two connection portions that connect the coil drive signal from the signal processing configuration to the field generating coil configuration;

the first-track inside and outside elongated portions extending along the x-axis direction adjacent to the first interior area, the first-track inside elongated portion located adjacent to the first-track interior boundary and the first-track outside elongated portion located adjacent to the first-track exterior boundary, the first-track inside and outside elongated portions each comprising a conductive trace having a nominal first-track generating trace width dimension along the y-axis direction; and the second-track inside and outside elongated portions extending along the x-axis direction adjacent to the second interior area, the second-track inside elongated portion located adjacent to the second-track interior boundary and the second-track outside elongated portion located adjacent to the second-track exterior boundary, the second-track inside and outside elongated portions each comprising a conductive trace having a nominal second-track generating trace width dimension along the y-axis direction;

at least a majority of the nominal sensing element width dimension is included between the first-track outside elongated portion and the second-track outside elongated portion, and the field generating coil configuration is configured such that each nominal first-track generating trace width dimension is at least 0.1 times the nominal first interior area width dimension, and each nominal second-track generating trace width dimension is at least 0.1 times the nominal second interior area width dimension.

\* \* \* \* \*